US012171001B2

(12) United States Patent
Gaal et al.

(10) Patent No.: US 12,171,001 B2
(45) Date of Patent: Dec. 17, 2024

(54) DETERMINING TRANSMISSION PREPARATION TIME FOR WIRELESS COMMUNICATION ON AT LEAST ONE CARRIER

(71) Applicant: QUALCOMM Incorporated, San Diego, CA (US)

(72) Inventors: Peter Gaal, San Diego, CA (US); Yi Huang, San Diego, CA (US); Yiqing Cao, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/240,844

(22) Filed: Apr. 26, 2021

(65) Prior Publication Data

US 2021/0337576 A1 Oct. 28, 2021

Related U.S. Application Data

(60) Provisional application No. 63/015,961, filed on Apr. 27, 2020.

(30) Foreign Application Priority Data

Apr. 27, 2020 (WO) ............... PCT/CN2020/087151
May 1, 2020 (WO) ............... PCT/CN2020/088544

(51) Int. Cl.
*H04W 72/21* (2023.01)
*H04W 72/0453* (2023.01)
(Continued)

(52) U.S. Cl.
CPC ....... *H04W 72/21* (2023.01); *H04W 72/0453* (2013.01); *H04W 72/1268* (2013.01); *H04W 72/23* (2023.01)

(58) Field of Classification Search
CPC ......... H04W 72/1284; H04W 72/0453; H04W 72/14; H04W 72/21; H04W 72/23; H04W 72/1268
See application file for complete search history.

(56) References Cited

U.S. PATENT DOCUMENTS

2019/0166608 A1* 5/2019 Kumar ................. H04W 36/36
2019/0223224 A1 7/2019 Park et al.
(Continued)

FOREIGN PATENT DOCUMENTS

CN 110475358 A 11/2019
EP 3629619 A1 4/2020
(Continued)

OTHER PUBLICATIONS

International Search Report and Written Opinion—PCT/US2021/029434—ISA/EPO—Aug. 31, 2021.
(Continued)

*Primary Examiner* — Jasper Kwoh
(74) *Attorney, Agent, or Firm* — Kevin M. Donnelly; Loza & Loza LLP

(57) ABSTRACT

A base station (BS) may determine (estimate) a preparation time for at least one uplink (UL) transmission by a user equipment (UE) on at least one radio frequency (RF) carrier. The BS may use the preparation time to ensure that the BS sends a grant for the at least one transmission to the UE a sufficient amount of time before the at least one transmission is scheduled to occur to give the UE sufficient time to conduct the at least one UL transmission. In some examples, the BS determines the preparation time based on adjusting an uplink preparation time according to a defined value. In some examples, the BS determines the preparation time based on a subcarrier spacing (SCS) index. The BS may select the SCS index used to determine the preparation time
(Continued)

from smallest of the SCS indexes configured for the different RF carriers.

24 Claims, 18 Drawing Sheets

(51) Int. Cl.
*H04W 72/1268* (2023.01)
*H04W 72/23* (2023.01)

(56) References Cited

U.S. PATENT DOCUMENTS

| | | | | |
|---|---|---|---|---|
| 2019/0297621 | A1* | 9/2019 | Li | H04L 5/00 |
| 2020/0221508 | A1* | 7/2020 | Huang | H04W 74/006 |
| 2020/0359410 | A1* | 11/2020 | Li | H04W 74/0808 |
| 2021/0243635 | A1* | 8/2021 | Yan | G01S 5/0036 |
| 2021/0306916 | A1* | 9/2021 | Bae | H04L 5/001 |
| 2022/0022245 | A1* | 1/2022 | Dudda | H04L 5/0094 |
| 2022/0225428 | A1* | 7/2022 | Xiong | H04W 72/14 |
| 2023/0171764 | A1 | 6/2023 | Gaal et al. | |

FOREIGN PATENT DOCUMENTS

| | | |
|---|---|---|
| WO | 2019031937 A1 | 2/2019 |
| WO | 2019216703 A1 | 11/2019 |
| WO | WO-2019213941 A1 | 11/2019 |
| WO | WO-2020032587 A1 | 2/2020 |

OTHER PUBLICATIONS

Qualcomm: "Draft Text Proposal to 38.214 Subclause 5.3 and 6.4 on UE Processing Time in the Case of CA", 3GPP Draft, 3GPP TSG-RAN WG1 Meeting AH 1801, R1-1803500, 38.214 TP on UE Processing Time With CA, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Mar. 5, 2018 (Mar. 5, 2018), XP051398797, 3 pages, Retrieved from the Internet: URL: http://www.3gpp.org/ftp/tsg%5Fran/WG1%5FRL1/TSGR1%5F92/Docs/ [retrieved on Mar. 5, 2018] section 5.3 section 6.4.

3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3-p. 18, line 8, paragraph [0010], Section 9, clauses 6, 9.2.1, 10.2 and 12, chapter 11.1 on p. 114-116.

Huawei., et al., "Discussion on the Remaining Issues of Supporting TX Switching between Two Uplink Carriers", 3GPP TSG RAN WG1 Meeting #100bis-e R1-2002661, E-meeting Apr. 20-Apr. 30, 2020, 17 Pages, Chapter 1-3, Appendix A1, Apr. 11, 2020 (Apr. 11, 2020) Sections 1, 2.

Qualcomm Incorporated: "Summary of [98- NR-05] Email Discussion on Timing Ambiguity", 3GPP TSG RAN WG1 Meeting #98bis, R1-1911088, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 22, 2019, 24 Pages, XP051798612, sections 1-3.

Qualcomm Incorporated: "Offline Summary for NR Timing Ambiguity", 3GPP TSG RAN WG1 Meeting #98bis, R1-1911529, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 22, 2019, 15 Pages, XP051798793, sections 1-3.

Moderator (China Telecom): "Summary#2 of Uplink Tx Switching", 3GPP TSG RAN WG1 #100bis, R1-2002724, e-Meeting, Apr. 20-30, 2020, pp. 1-16.

* cited by examiner

DETERMINING TRANSMISSION PREPARATION TIME FOR WIRELESS COMMUNICATION ON AT LEAST ONE CARRIER

CROSS-REFERENCE TO RELATED APPLICATION(S)

The present application for patent claims priority to and the benefit of U.S. Provisional Application No. 63/015,961, titled "DETERMINING TRANSMISSION PREPARATION TIME FOR WIRELESS COMMUNICATION ON AT LEAST ONE CARRIER," filed Apr. 27, 2020, pending Patent Cooperation Treaty Application No. PCT/CN2020/087151, titled "DETERMINING TRANSMISSION PREPARATION TIME FOR WIRELESS COMMUNICATION ON AT LEAST ONE CARRIER," filed Apr. 27, 2020, and pending Patent Cooperation Treaty Application No. PCT/CN2020/088544, titled "DETERMINING TRANSMISSION PREPARATION TIME FOR WIRELESS COMMUNICATION ON AT LEAST ONE CARRIER," filed May 1, 2020, each of which is assigned to the assignee hereof and hereby expressly incorporated by reference herein as if fully set forth below in its entirety and for all applicable purposes.

TECHNICAL FIELD

Aspects of the present disclosure generally relate to wireless communication and, more particularly, to determining a preparation time for at least one transmission on at least one carrier of a multi-carrier wireless communication system.

BACKGROUND

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS. In addition, in a scenario where a BS supports multiple radio frequency (RF) carriers, the BS may schedule a UE on one or more RF carriers.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One innovative aspect of the subject matter described in this disclosure can be implemented in a method for wireless communication at a base station. The method includes calculating a preparation time for at least one uplink transmission based on adjusting an uplink preparation time according to a defined value. The method also includes transmitting a grant for the at least one uplink transmission to a user equipment based on the preparation time. The grant indicates resources for the at least one uplink transmission on a first radio frequency (RF) carrier, on a second RF carrier, or on each of the first RF carrier and the second RF carrier.

Another innovative aspect of the subject matter described in this disclosure can be implemented in a base station that includes a transceiver, a memory, and a processor communicatively coupled to the transceiver and the memory. The processor and the memory are configured to calculate a preparation time for at least one uplink transmission based on adjusting an uplink preparation time according to a defined value. The processor and the memory are also configured to transmit, via the transceiver, a grant for the at least one uplink transmission to a user equipment based on the preparation time. The grant indicates resources for the at least one uplink transmission on a first radio frequency (RF) carrier, on a second RF carrier, or on each of the first RF carrier and the second RF carrier.

Another innovative aspect of the subject matter described in this disclosure can be implemented in a base station that includes a means for calculating a preparation time and a means for transmitting a grant. The means for calculating a preparation time calculates a preparation time for at least one uplink transmission based on adjusting an uplink preparation time according to a defined value. The means for transmitting a grant transmits a grant for the at least one uplink transmission to a user equipment based on the preparation time. The grant indicates resources for the at least one uplink transmission on a first radio frequency (RF) carrier, on a second RF carrier, or on each of the first RF carrier and the second RF carrier.

Another innovative aspect of the subject matter described in this disclosure can be implemented in an article of manufacture for use by a base station. The article of manufacture includes a non-transitory computer-readable medium having stored therein instructions executable by one or more processors of the base station to calculate a preparation time for at least one uplink transmission based on adjusting an uplink preparation time according to a defined value. The computer-readable medium also has stored therein instructions executable by one or more processors of the wireless communication device to transmit a grant for the at least one uplink transmission to a user equipment based on the preparation time. The grant indicates resources for the at least one uplink transmission on a first radio frequency (RF) carrier, on a second RF carrier, or on each of the first RF carrier and the second RF carrier.

In some implementations of the above method, base stations, and article of manufacture, the adjusting the uplink preparation time according to the defined value may include increasing the uplink preparation time by a constant value. In some implementations of the above method, base stations, and article of manufacture, the adjusting the uplink preparation time according to the defined value may include increasing the uplink preparation time by a constant value for uplink carrier aggregation of the first RF carrier and the second RF carrier. In some implementations of the above method, base stations, and article of manufacture, the at least one uplink transmission may include at least one channel state information (CSI) transmission and/or at least one physical uplink shared channel (PUSCH) transmission.

In some implementations of the above method, base stations, and article of manufacture, the calculating the preparation time may include determining a minimum SCS index based on a first subcarrier spacing (SCS) index for the first RF carrier and a second SCS index for the second RF carrier and calculating the preparation time based on the minimum SCS index. In some implementations of the above method, base stations, and article of manufacture, the determining the minimum SCS index based on the first SCS index for the first RF carrier and the second SCS index for the second RF carrier comprises may include selecting a lowest SCS index from the first SCS index and the second SCS index. In some implementations of the above method, base stations, and article of manufacture, the calculating the preparation time based on the minimum SCS index may include selecting a first parameter based on the minimum SCS index and calculating the preparation time based on the parameter.

One innovative aspect of the subject matter described in this disclosure can be implemented in a method for wireless communication at a base station. The method includes determining a minimum subcarrier spacing (SCS) index based on a first SCS index for a first radio frequency (RF) carrier and a second SCS index for a second RF carrier. The method also includes calculating a preparation time for at least one uplink transmission based on the minimum SCS index and transmitting a grant for the at least one uplink transmission to a user equipment based on the preparation time. The grant indicates resources for the at least one uplink transmission on the first RF carrier or on each of the first RF carrier and the second RF carrier.

Another innovative aspect of the subject matter described in this disclosure can be implemented in a base station that includes a transceiver, a memory, and a processor communicatively coupled to the transceiver and the memory. The processor and the memory are configured to determine a minimum subcarrier spacing (SCS) index based on a first SCS index for a first radio frequency (RF) carrier and a second SCS index for a second RF carrier. The processor and the memory are also configured to calculate a preparation time for at least one uplink transmission based on the minimum SCS index and transmit, via the transceiver, a grant for the at least one uplink transmission to a user equipment based on the preparation time. The grant indicates resources for the at least one uplink transmission on the first RF carrier or on each of the first RF carrier and the second RF carrier.

Another innovative aspect of the subject matter described in this disclosure can be implemented in a base station that includes a means for determining a minimum subcarrier spacing (SCS) index, means for calculating a preparation time, and means for transmitting a grant. The means for determining a minimum SCS index determines a minimum SCS index based on a first SCS index for a first radio frequency (RF) carrier and a second SCS index for a second RF carrier. The means for calculating a preparation time calculates a preparation time for at least one uplink transmission based on the minimum SCS index. The means for transmitting a grant transmits a grant for the at least one uplink transmission to a user equipment based on the preparation time. The grant indicates resources for the at least one uplink transmission on the first RF carrier or on each of the first RF carrier and the second RF carrier.

Another innovative aspect of the subject matter described in this disclosure can be implemented in an article of manufacture for use by a base station. The article of manufacture includes a non-transitory computer-readable medium having stored therein instructions executable by one or more processors of the base station to determine a minimum subcarrier spacing (SCS) index based on a first SCS index for a first radio frequency (RF) carrier and a second SCS index for a second RF carrier. The computer-readable medium also has stored therein instructions executable by one or more processors of the wireless communication device to calculate a preparation time for at least one uplink transmission based on the minimum SCS index and transmit a grant for the at least one uplink transmission to a user equipment based on the preparation time. The grant indicates resources for the at least one uplink transmission on the first RF carrier or on each of the first RF carrier and the second RF carrier.

In some implementations of the above method, base stations, and article of manufacture, the determining the minimum SCS index based on the first SCS index for the first RF carrier and the second SCS index for the second RF carrier may include selecting a lowest SCS index from the first SCS index and the second SCS index. In some implementations of the above method, base stations, and article of manufacture, the calculating the preparation time for at least one uplink transmission based on the minimum SCS index may include selecting a first parameter based on the minimum SCS index and calculating the preparation time based on the first parameter. In some implementations of the above method, base stations, and article of manufacture, the first parameter may specify a quantity of symbols.

In some implementations of the above method, base stations, and article of manufacture, the resources for the at least one uplink transmission may commence at a first time. In some implementations of the above method, base stations, and article of manufacture, the transmitting the grant for the at least one uplink transmission to the user equipment based on the preparation time may include transmitting the grant to the user equipment at a second time that precedes the first time by at least the preparation time.

In some implementations of the above method, base stations, and article of manufacture, the grant may be configured to trigger a switch by the user equipment between operating in a first uplink transmission mode and operating in a second uplink transmission mode. In some implementations of the above method, base stations, and article of manufacture, for operation by the UE in the first uplink transmission mode, the grant may indicate at least one first resource for the at least one uplink transmission on the first RF carrier and not on the second RF carrier. In some implementations of the above method, base stations, and article of manufacture, for operation by the UE in the second uplink transmission mode, the grant may indicate at least one second resource for the at least one uplink transmission on each of the first RF carrier and the second RF carrier.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
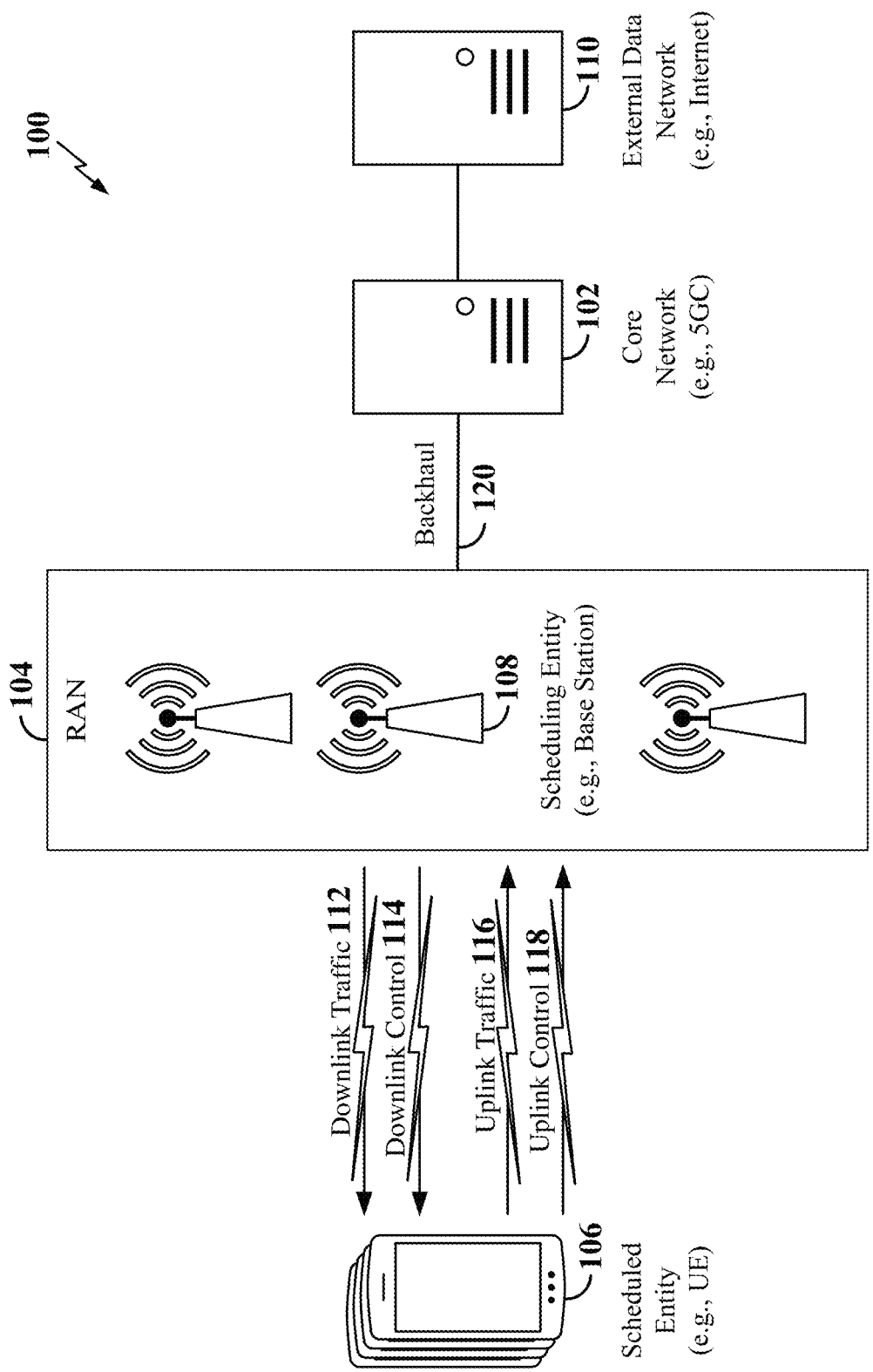
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects relate generally to determining a preparation time for at least one transmission on at least one carrier of a multi-carrier communication system. In some examples, the at least one transmission may be a physical uplink shared channel (PUSCH) transmission, a channel state information (CSI) transmission, or some other type of user equipment (UE) transmission.

In some examples, a base station or a UE may estimate or otherwise determine the amount of preparation time (e.g., referred to as an uplink transmission preparation time) needed by the UE to perform an uplink transmission to the base station after the uplink transmission has been scheduled. In particular aspects, the preparation time accounts for or includes a duration of time needed by the UE to switch between different uplink transmission modes involving one or more radio frequency (RF) carriers. In some examples, an uplink transmission mode switch (e.g., a switch from a first uplink transmission mode to a second uplink transmission mode) may involve the UE reconfiguring one or more of its RF chains to transmit on a different RF carrier.

In some examples, the base station may take the preparation time into account to determine when to transmit a grant to the UE. For example, when the grant schedules a transmission mode switch by the UE, the base station may transmit the grant to the UE at a time that precedes the scheduled transmission mode switch by an amount of time that is greater than or equal to the preparation time.

In some particular implementations, the base station may calculate (e.g., estimate) the preparation time for a transmission by the UE by adjusting a preparation time according to a defined value. For example, the preparation time may be increased based on the defined value for certain scenarios (e.g., multi-carrier scenarios). In some examples, the base station may determine whether a grant will cause a UE to perform an uplink transmission mode switch. If so, the base station may estimate the preparation time using the defined value, thereby providing a longer estimated preparation time to account for the uplink transmission mode switch. On the other hand, if the grant will not cause the UE to perform an uplink transmission mode switch, the base station may estimate the preparation time without using the defined value (or by setting the defined value to zero for the preparation time estimation).

In some particular implementations, the base station may calculate (e.g., estimate) the preparation time for a transmission by the UE based on a subcarrier spacing (SCS) index. For example, in some multi-carrier scenarios, a first SCS index configured for a first RF carrier may be different from a second SCS index configured for a second RF carrier. In such a scenario, the base station may determine a minimum SCS index based on the first SCS index and the second SCS index (e.g., select the lowest SCS index of the first SCS index and the second SCS index) and use the selected SCS index to calculate (e.g., estimate) the preparation time. In some aspects, using the lowest SCS index may ensure that the estimated preparation time is sufficiently long for each carrier since an estimated preparation time based on the lower SCS index is longer than an estimated preparation time based on the higher SCS index.

Particular aspects of the subject matter described in this disclosure can be implemented to realize one or more of the following potential advantages. In some examples, the described techniques can be used to ensure that a base station estimates an uplink transmission preparation time that is sufficiently long, such that the base station may transmit a grant to a UE sufficiently in advance of a scheduled uplink transmission, to enable the UE to prepare for the uplink transmission on one RF carrier or on multiple RF carriers.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
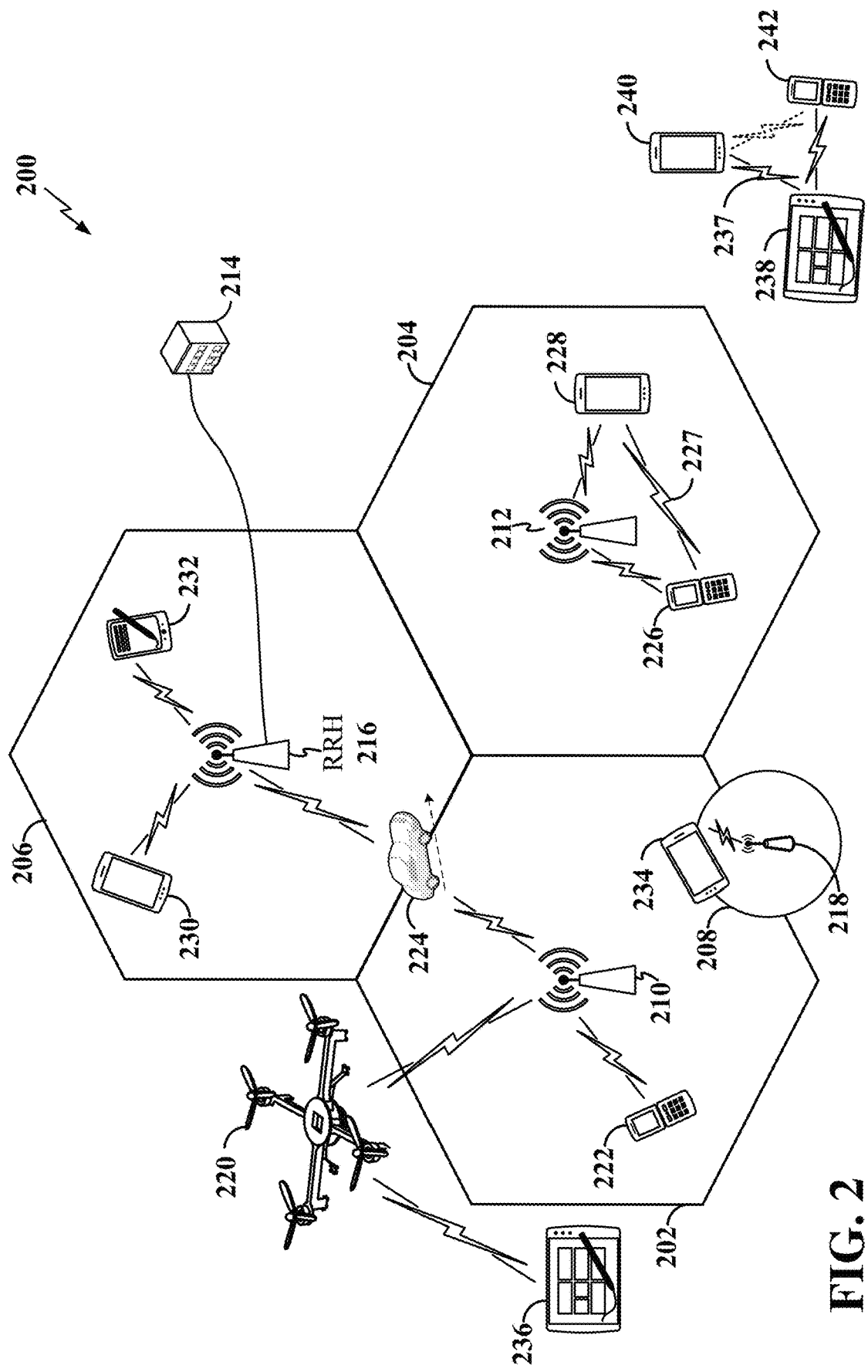
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
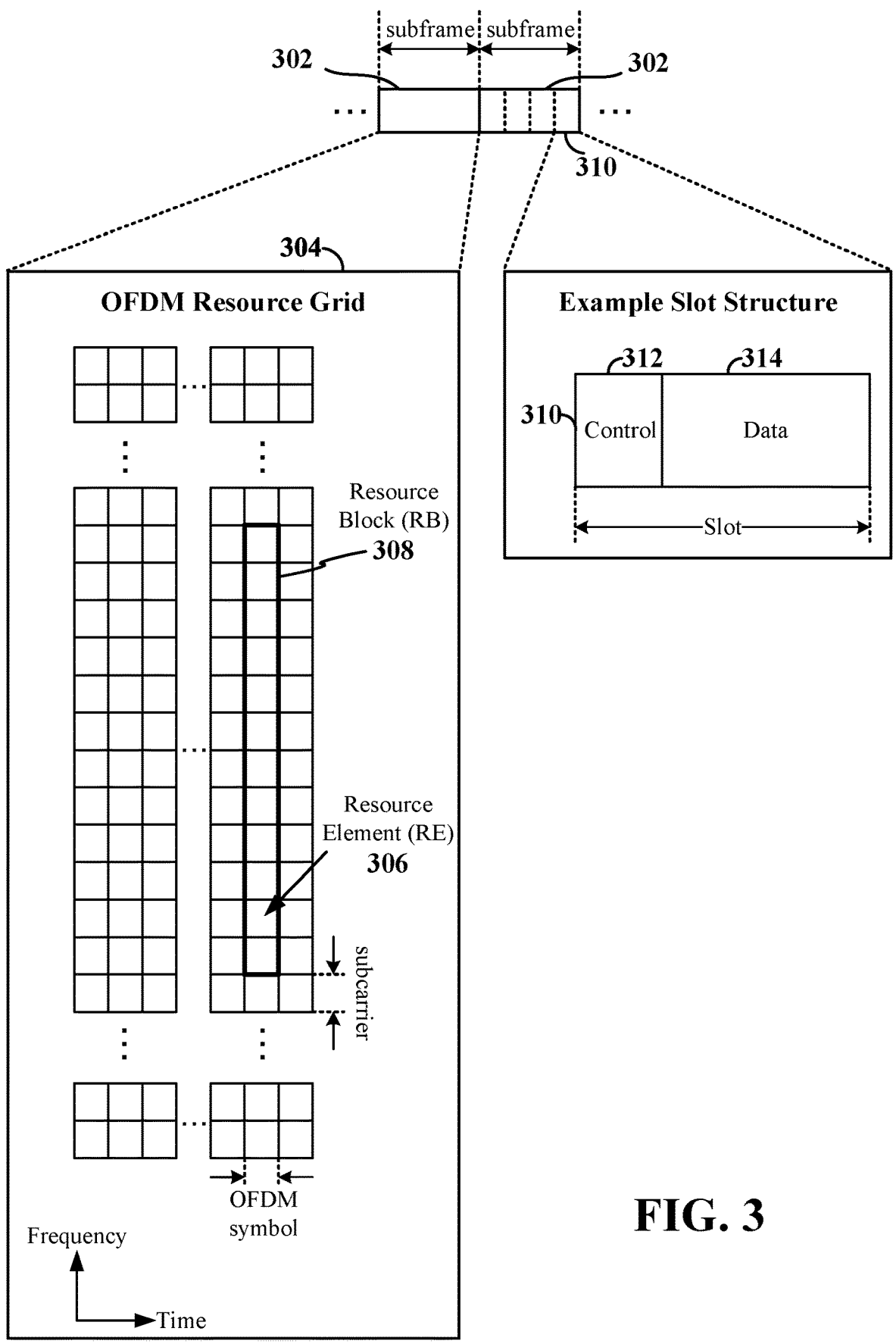
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port.

That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Wireless communication networks such as NR networks may support carrier aggregation in a multi-cell transmission environment where, for example, different base stations and/or different transmission and reception points (TRPs) may transmit on different component carriers. In some aspects, the term component carrier may refer to a carrier frequency (or band) utilized for communication within a cell. In some examples, different TRPs may be associated with a single serving cell (e.g., a single base station). In some examples, different TRPs may be associated with different serving cells (e.g., different base stations may employ different TRPs).

Figure 4:
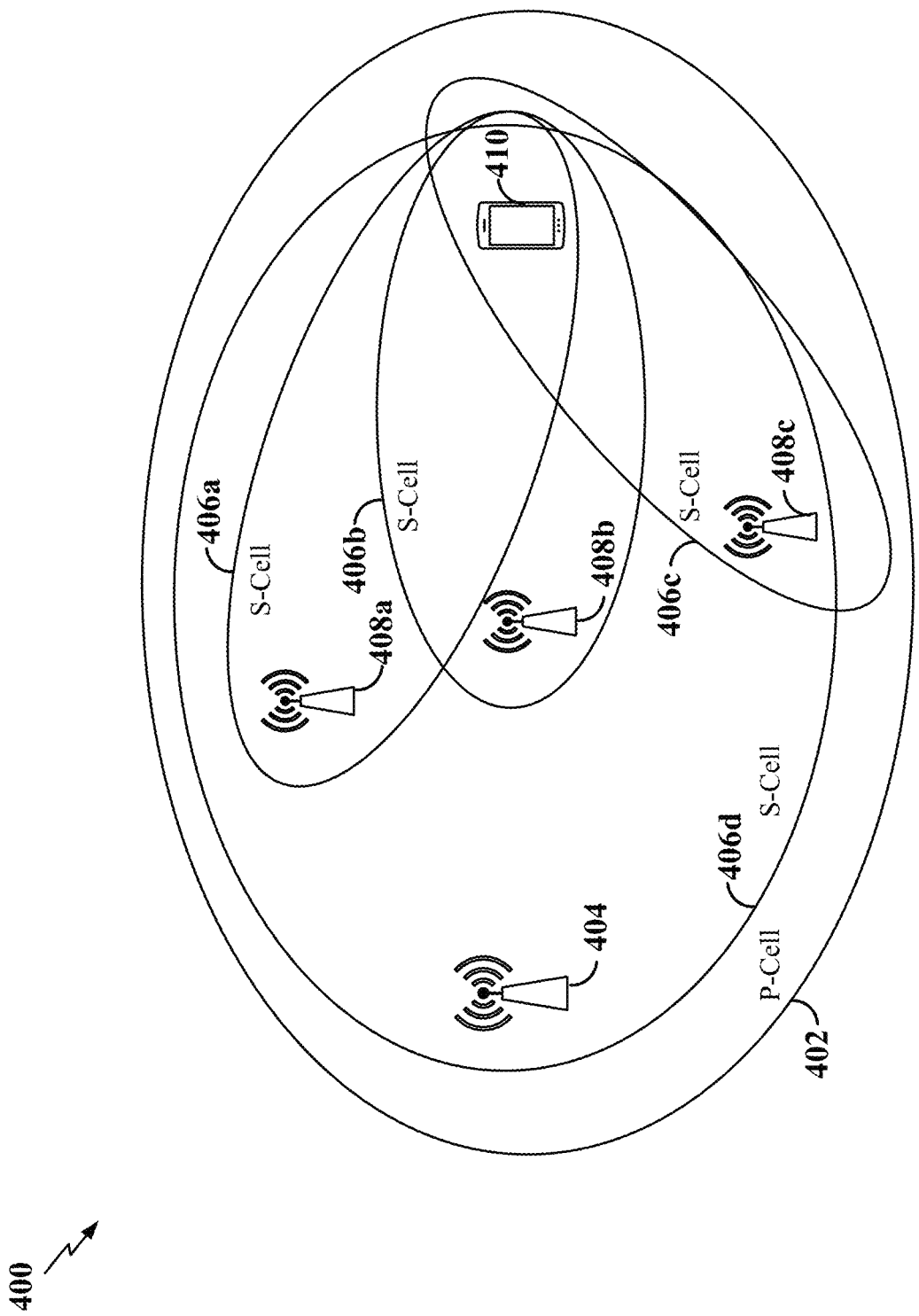
FIG. 4 is a conceptual illustration of a wireless communication system that shows a base station (BS) and a user equipment (UE) communicating via multiple radio frequency (RF) carriers according to some aspects.

FIG. 4 is a conceptual illustration of a wireless communication system that shows a base station (BS) and a user equipment (UE) communicating via multiple carriers according to some aspects of the disclosure. In particular, FIG. 4 shows an example of a multi-cell transmission environment 400 that includes a primary serving cell (PCell) 402 and one or more secondary serving cells (SCells) 406a, 406b, 406c, and 406d. The PCell 402 may be referred to as the anchor cell that provides a radio resource control (RRC) connection to a UE (e.g., the UE 410). In some examples, the PCell and one or more of the SCells may be co-located. For example, a TRP for the PCell and a TRP for an SCell may be installed at the same location.

When carrier aggregation is used in the multi-cell transmission environment 400, one or more of the SCells 406a-406d may be activated or added to the PCell 402 to form the serving cells serving the UE 410. In this case, each of these serving cells corresponds to a component carrier (CC). The CC of the PCell 402 may be referred to as a primary CC, and the CC of an SCell (e.g., SCell 406a-406d) may be referred to as a secondary CC. Each of the PCell 402 and the SCells 406a-406d may be served by a respective TRP 404 and 408a-408c. Each TRP 404 and 408a-408c may be a base station (e.g., gNB), remote radio head of a gNB, or other scheduling entity similar to those illustrated in any of FIGS. 1, 2, 5, and 10. In some examples, a base station (e.g., base station 504) may include multiple TRPs, each corresponding to one of a plurality of co-located antenna arrays, each supporting a different carrier. In the example of FIG. 4, the PCell 402 is served by the base station 404 and the SCells 406a-406c are each served by a respective base station 408a-408c. In addition, the SCell 406d and the PCell 402 are co-located and served by a single base station 404.

The coverage of the PCell 402 and the coverage of the SCell 406d may differ as shown in FIG. 4. For example, component carriers in different frequency bands may experience different path loss and, thus, provide different coverage. In some examples, the PCell 402 may be a low band cell, and the SCells 406 may be high band cells. A low band (LB) cell uses a CC in a frequency band lower than that of the high band cells. For example, the high band cells may use a mmWave CC, and the low band cell may use a CC in a band (e.g., sub-6 GHz band) that is lower than mmWave.

In general, a cell using a mmWave CC can provide greater bandwidth than a cell using a low band CC. In addition, when using a frequency carrier that is above 6 GHz (e.g., mmW), beamforming may be used to transmit and receive signals in some examples.

In some examples, the PCell 402 may utilize a first radio access technology (RAT), such as LTE, while one or more of the SCells 406 may utilize a second RAT, such as NR. In this case, the multi-cell transmission environment 400 may be referred to as a multi-RAT-dual connectivity (MR-DC) environment. One example of MR-DC is an Evolved-Universal Terrestrial Radio Access Network-New Radio dual connectivity (EN-DC) mode that enables a UE to simultaneously connect to an LTE base station and a NR base station to receive data packets from and send data packets to both the LTE base station and the NR base station.

Figure 5:
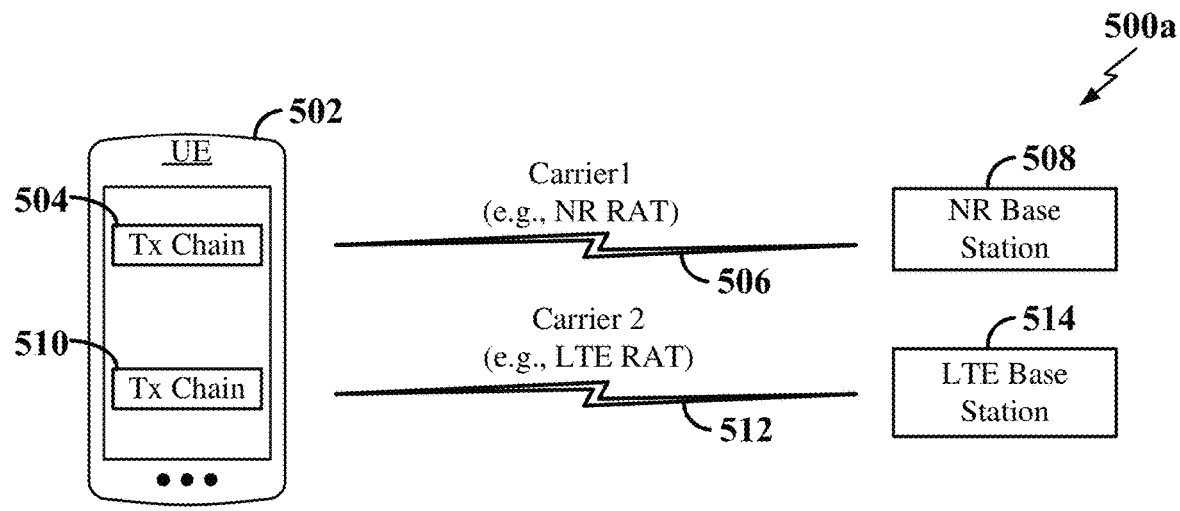
FIG. 5 is a conceptual illustration of wireless communication between a UE and at least one BS that shows the UE using two transmit chains to transmit on one or more carriers according to some aspects.
Figure 5:
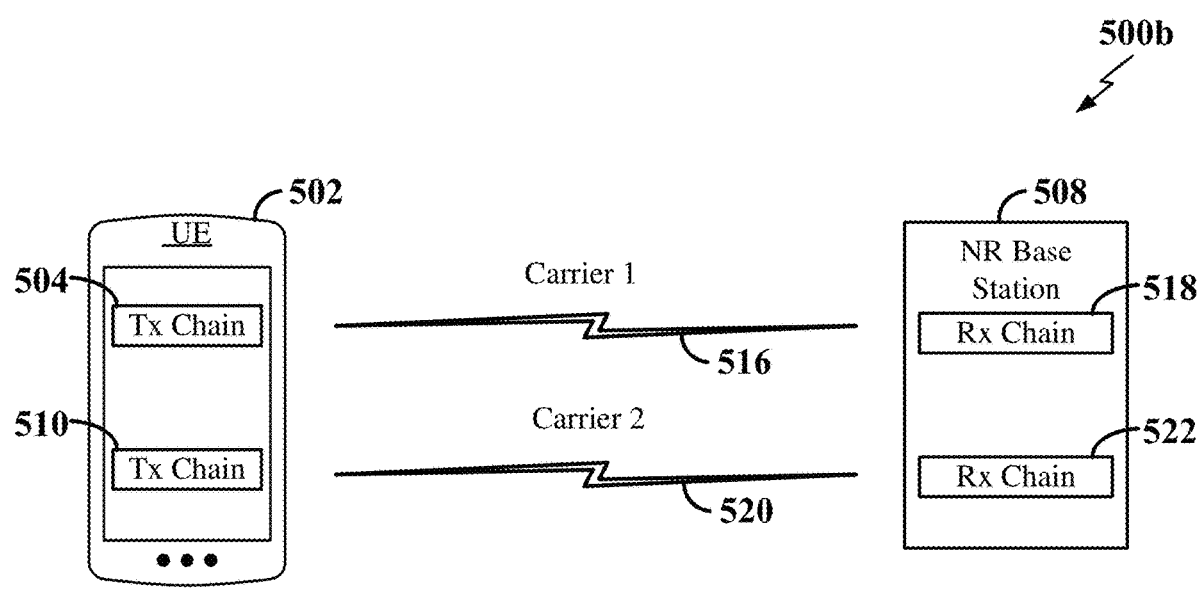

A user equipment may include multiple transmit chains and/or multiple receive chains to support multi-carrier wireless communication. FIG. 5 is a conceptual illustration 500 of wireless communication between a UE and at least one BS that shows the UE using two transmit chains to transmit on one or more carriers according to some aspects. In some examples, a transmit chain refers to baseband processing (e.g., to generate PUSCH data and other uplink information) and a corresponding power amplifier. With two transmit chains, a UE may transmit two separate uplink streams at the same time. A transmit chain (e.g., the power amplifier) may be configurable to transmit on different RF bands (e.g., different RF carriers) at different times. In some examples, the UE 502 may correspond to any of the UEs or scheduled entities shown in any of FIGS. 1, 2, 4, and 17.

In a first scenario 500a of FIG. 5, the UE 502 uses a first transmit (Tx) chain 504 to transmit a first signal stream 506 to an NR BS 508 via a first RF carrier (carrier 1) and uses a second transmit (Tx) chain 510 to transmit a second signal stream 512 to an LTE BS 514 via a second RF carrier (carrier 2). The first scenario 500a illustrates an example of the EN-DC mode of operation discussed above where the UE 502 can simultaneously connect to the NR BS 508 and the LTE BS 514 to simultaneously transmit data packets to both the NR BS 508 and the LTE BS 514. In some examples (e.g., for inter-band EN-DC), the first RF carrier and the second RF carrier may represent different RF bands.

In a second scenario 500b, the UE 502 uses the first transmit (Tx) chain 504 to transmit a first signal stream 516 to a first receive (Rx) chain 518 of the NR BS 508 via a first RF carrier (carrier 1) and uses the second transmit (Tx) chain 510 to transmit a second signal stream 520 to a second receive (Rx) chain 522 of the NR BS 508 via a second RF carrier (carrier 2). In some examples (e.g., for inter-band UL carrier aggregation), the first RF carrier and the second RF carrier may represent different RF bands.

In some examples, the second scenario 500b could apply to a scenario where the first RF carrier (e.g., one or more bands of the first RF carrier) may be used for FDD communication and the second RF carrier (e.g., one or more bands of the second RF carrier) may be used for TDD communication. For example, the NR BS 508 may schedule UL transmissions on a band designated for FDD when the link budget to the UE 502 is relatively low and/or when the uplink throughput requirement is relatively low. Conversely, the NR BS 508 may schedule UL transmissions on a band designated for TDD when the link budget to the UE 502 is relatively high and/or when the uplink throughput requirement is relatively high.

In some examples, the second scenario 500b could apply to a supplemental uplink (SUL) scheme. In 5G NR, conventional carriers can be paired with lower frequency carriers known as SUL carriers for coverage enhancement. In an SUL scheme (e.g., in contrast with a carrier aggregation scheme), a UE can transmit on either the SUL carrier or the non-SUL carrier (e.g., the main/conventional carrier). Thus, in the second scenario 500b, one of the RF carriers may be an SUL carrier and the other RF carrier may be a non-SUL carrier.

In some examples, a UE may be capable of switching between different uplink transmission modes. For example, a single UE may support any of the scenarios described in FIG. 5. Consequently, a BS may schedule a UE to transmit on different RF carriers during different time slots, where this scheduling may result in the UE switching from a first transmission mode to a second transmission mode, or vice versa.

As one example, network operators may aggregate bands n78 (3.5 GHz) and n1 (2.1 GHz). To enable UL MIMO in band n78 for a UE that has two transmit chains, a UE may be configured to switch from transmitting using one transmit chain to transmitting using two transmit chains, or vice versa (this feature may be referred to as UL 1 Tx to 2 Tx switching). Here, uplink carrier aggregation and uplink MIMO may be supported using two transmit chains. In addition, a single transmit chain mode may be supported (e.g., by configuring a transmit chain to switch from a first component carrier (CC1) to a second component carrier (CC2)).

Tables 1 and 2 illustrate two examples of options that a network may use to configure a UE to use different uplink transmission modes. These uplink transmission modes may be used, for example, for multi-carrier UL scenarios such as Inter-band UL carrier aggregation, SUL without EN-DC, and Inter-band EN-DC without SUL.

The first option (option 1) shown in Table 1 has two cases (e.g., two uplink transmission modes). In the first case (case 1), the UE uses one transmit (Tx) chain to transmit on carrier 1 (e.g., CC1) and does not transmit on carrier 2 (e.g., CC2). In the second case (case 2) for option 1, the UE uses one transmit chain or two transmit chains to transmit on carrier 2 (e.g., CC2) and does not transmit on carrier 1 (e.g., CC1).

TABLE 1

| Case 1 | 1 Tx on carrier 1 and 0 Tx on carrier 2 |
| Case 2 | 0 Tx on carrier 1 and 1 or 2 Tx on carrier 2 |

The second option (option 2) shown in Table 2 also has two cases (e.g., two uplink transmission modes). In the first case (case 1), the UE uses a first transmit chain to transmit on carrier 1 (e.g., CC1) and uses a second transmit chain to transmit on carrier 2 (e.g., CC2). In the second case (case 2) for option 2, the UE uses two transmit chains to transmit on carrier 2 (e.g., CC2) and does not transmit on carrier 1 (e.g., CC1).

TABLE 2

| Case 1 | 1 Tx on carrier 1 and 1 Tx on carrier 2 |
| Case 2 | 0 Tx on carrier 1 and 2 Tx on carrier 2 |

Figure 6:
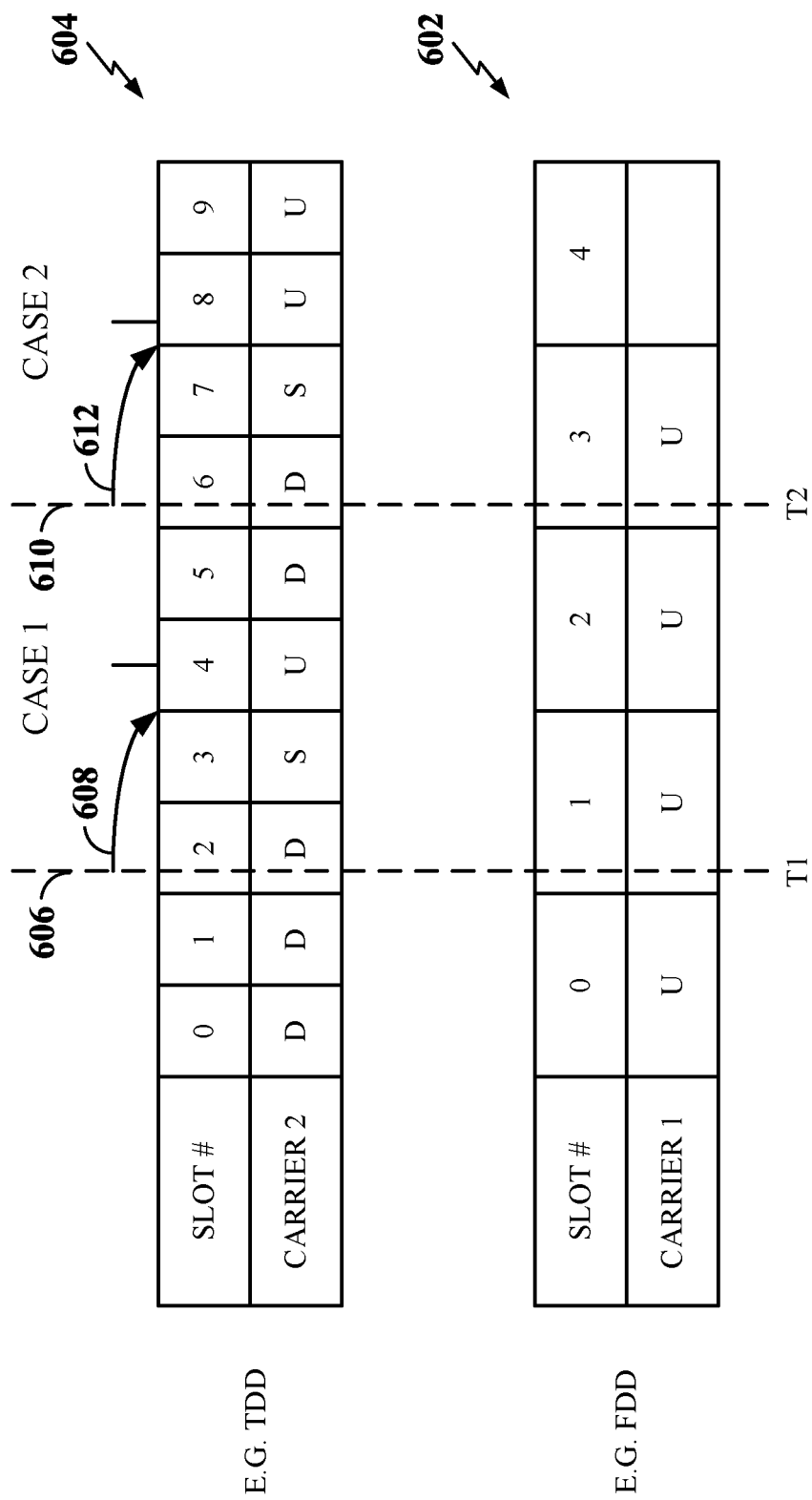
FIG. 6 is a schematic illustration of an example of carriers and slots for wireless communication that shows that a UE may use different transmission modes in a multi-carrier scenario and that a BS may send a grant to a UE a certain period of time prior to a transmission mode switch according to some aspects.

FIG. 6 is a schematic illustration of an example of carriers and slots for wireless communication that shows that a UE may use different transmission modes in a multi-carrier scenario. A first carrier (carrier 1) 602 is an FDD carrier configured for uplink transmissions in this example. A second carrier (carrier 2) 604 is a TDD carrier in this example. In some examples, one carrier may be an NR carrier and the other carrier may be an LTE carrier. In some examples, one carrier may use a sub-6 GHz band and the other carrier may use a millimeter wave (mmW) frequency band. In some examples, one carrier may use Frequency Range 1 (FR1) and the other carrier may use Frequency Range 2 (FR2). The first and second carriers could take other forms in other examples.

As indicated by the respective lengths of the slots for carrier 1 and carrier 2, the communication on these carriers may use different SCSs. As one non-limiting example, a 15 kHz SCS may be used on carrier 1 and a 30 kHz SCS may be used on carrier 2. Other SCSs may be used in other examples.

As shown in FIG. 6, a BS may schedule a UE to transmit on different RF carriers during different time slots. Specifically, the BS scheduled the UE to transmit on slots 0, 1, 2, and 3 of the first carrier (carrier 1) 602. In addition, the BS scheduled the UE to transmit on slots 4, 8, and 9 of the second carrier (carrier 2) 604. Thus, slot 4 of the second carrier 604 may correspond to option 2, case 1, where the UE simultaneously transmits on carrier 1 and carrier 2. Conversely, slot 8 (as well as slot 9) of the second carrier 604 may correspond to option 2, case 2, where the UE simultaneously transmits two signal streams (e.g., two MIMO layers) on carrier 2.

In some cases, this scheduling may result in the UE reconfiguring its transmit chains when switching from a first transmission mode to a second transmission mode, or vice versa. For example, the UE may initially receive a first DCI that schedules a first transmission mode (case 1 shown FIG. 6) which configures the UE to use a first transmit chain to transmit on the first RF carrier and configures the UE to use a second transmit chain to transmit on the second RF carrier. Accordingly, during the TDD slot 4 and the first half of the FDD slot 2, the UE will transmit on both carrier 1 and carrier 2 using the first and second transmit chain. Subsequently, the UE may receive a second DCI that schedules a second transmission mode (case 2 shown FIG. 6) which configures the UE to use the first and second transmit chains to transmit on the second RF carrier and configures the UE to not transmit on the first RF carrier. Accordingly, during the TDD slots 8 and 6, the UE will transmit on carrier 2 using the first and second transmit chains. Other examples are possible.

In general, it will take a certain amount of time for a UE to switch from one transmission mode to another after receiving a DCI that results in a transmission mode switch. For example, in addition to the time required for reconfiguring its transmit chains, a UE may need a sufficient amount of time for DL scheduling decoding (e.g., decoding the grant from the BS), UL signal generating (e.g., retrieving information from memory and encoding the information), and waiting for a valid transmit time in the UL transmit pipeline (e.g., waiting for a valid beginning of a transmission, which may correspond to the completion of the last UL transmission). The duration of time from the time of a DCI that schedules a transmission mode switch to the time that the UE is able to transmit the data scheduled by that DCI may be referred to as a preparation time (e.g., an uplink preparation time).

The disclosure relates in some aspects to techniques for determining a preparation time for at least one transmission by a UE on at least one RF carrier. A BS may send a DCI (including a grant) to a UE a certain period of time prior to a transmission mode switch according to some aspects of the disclosure. For example, to account for a transmission mode switch, a BS may send the grant that indicates (e.g., schedules) the switch a sufficient amount of time before the switch is to occur to give the UE sufficient time to process the grant and prepare for the switch.

As one example, the BS may send the grant for slot 2 of carrier 1 (slot 4 of carrier 2) at or before a time T1 represented by a first dashed line 606. As indicated by a first arrow 608, this time should precede the scheduled slot(s) by an amount of time that is greater than the processing time required by the UE to decode the grants, etc., to transmit during the scheduled slot(s).

As another example, the BS may send the grant for slot 8 of carrier 2 at or before a time T2 represented by a second dashed line 610. As indicated by a second arrow 612, this time also should precede the scheduled slot(s) by an amount of time that is greater than the processing time required by the UE to decode the grants, etc., to transmit during the slot(s).

A base station may execute a preparation time formula to calculate the preparation time for at least one transmission by a UE. For example, 3GPP Rel. 15 (e.g., TS 38.214 v15.8.0 sec. 6.4 (2019 December)) defines a PUSCH preparation time (e.g., the computation time for transmitting a PUSCH after receiving a scheduling DCI) for a single carrier scenario as set forth in Equation 1:

$$T_{proc,2} = \max((N_2 + d_{2,1})(2048+144) \cdot \kappa 2^{-\mu} \cdot T_C, d_{2,2})$$ EQUATION 1

The parameter $N_2$ is based on the SCS index ($\mu$) of Table 6.4-1 and Table 6.4-2 of 3GPP TS 38.214 v15.8.0 (2019 December), reproduced in Tables 3 and 4 below, for UE processing capability 1 and 2, respectively. The parameter $\mu$ corresponds to the one of ($\mu_{DL}$, $\mu_{UL}$) resulting with the largest $T_{proc,2}$, the parameter $\mu_{DL}$ corresponds to the subcarrier spacing of the downlink with which the PDCCH carrying the DCI scheduling the PUSCH was transmitted, and the parameter $\mu_{UL}$ corresponds to the subcarrier spacing of the uplink channel with which the PUSCH is to be transmitted. In some aspects, the parameter $N_2$ may correspond to the amount of time it takes for a UE to decode a grant. The parameter $d_{2,1}$ is either a zero (0) or a one (1) (e.g., depending on whether the first DMRS symbol includes data). The parameter $\kappa$ is defined in subclause 4.1 of 3GPP TS 38.211 v15.8.0 (2019 December). The parameter $T_C$ is a constant. The parameter $d_{2,2}$ is either a zero (0) or a one (1) (e.g., depending on whether there is a change in the BWP).

TABLE 3

| $\mu$ | PUSCH preparation time $N_2$ [symbols] |
|---|---|
| 0 | 10 |
| 1 | 12 |
| 2 | 23 |
| 3 | 36 |

TABLE 4

| $\mu$ | PUSCH preparation time $N_2$ [symbols] |
|---|---|
| 0 | 5 |
| 1 | 5.5 |
| 2 | 11 for frequency range 1 |

A BS may determine a preparation time for a CSI transmission in a similar manner. For example, 3GPP Rel. 15 (e.g., TS 38.214 v15.8.0 sec. 5.4 (2019 December)) defines a CSI preparation time (e.g., the computation time for transmitting a CSI after receiving a scheduling DCI) for a single carrier scenario as set forth in Equation 2:

$$T_{proc,CSI} = (Z)(2048+144) \times k2^{-\mu} \cdot T_c$$ EQUATION 2

Example values of the parameter Z of Equation 2 are set forth in Table 5.4-1 and Table 5.4-2 of 3GPP TS 38.211 v15.8.0 (2019 December)), reproduced in Tables 5 and 6 below, respectively. In some aspects, the parameter μ corresponds to the min ($\mu_{PDCCH}$, $\mu_{CSI-RS}$, $\mu_{UL}$) where the parameter $\mu_{PDCCH}$ corresponds to the subcarrier spacing of the PDCCH with which the DCI was transmitted, the parameter $\mu_{UL}$ corresponds to the subcarrier spacing of the PUSCH with which the CSI report is to be transmitted, and the parameter $\mu_{CSI-RS}$ corresponds to the minimum subcarrier spacing of the aperiodic CSI-RS triggered by the DCI.

TABLE 5

| | $Z_1$ [symbols] | |
|---|---|---|
| μ | $Z_1$ | $Z'_2$ |
| 0 | 10 | 8 |
| 1 | 13 | 11 |
| 2 | 25 | 21 |
| 3 | 43 | 36 |

TABLE 6

| | $Z_1$ [symbols] | | $Z_2$ [symbols] | | $Z_2$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | Min(44, $X_2$ + $KB_1$) | $X_2$ |
| 3 | 97 | 85 | 152 | 140 | Min(97, $X_3$ + $KB_2$) | $X_3$ |

As mentioned above, Equations 1 and 2 are specified for a single carrier scenario. However, the preparation times computed for PUSCH and CSI using this conventional approach might not be sufficient for a transmission mode switch scenario since the switching transition period may be relatively long (e.g., several symbols in duration).

The disclosure relates in some aspects to determining a preparation time for an uplink (e.g., PUSCH or CSI) transmission that takes into account UE processing delay due to a transmission mode switch. Initially, a technique for determining a preparation time for PUSCH transmission will be described, followed by a technique for determining a preparation time for CSI transmission.

The disclosure relates in some aspects to adding a defined value to Equation 1 to account for the switching time as shown in Equation 3 and, alternatively, in Equation 4:

$$T_{proc,2} = \max((N_2 + \text{switch\_time} + d_{2,1})(2048+144) \cdot \kappa 2^{-\mu} \cdot T_C, d_{2,2}) \quad \text{EQUATION 3}$$

$$T_{proc,2} = \max((N_2 + d_{2,1})(2048+144) \cdot \kappa 2^{-\mu} \cdot T_C + \text{switch\_time}, d_{2,2}) \quad \text{EQUATION 4}$$

In Equations 3 and 4, the parameter switch_time is a defined value (e.g., a constant) that is used to account for the switching time. In some examples, p in Equations 3 and 4 may be selected as the lower of ($\mu_{DL}$, $\mu_{UL}$), where $\mu_{DL}$ is the lowest SCS among BWPs of the RF carrier and p UL is the lowest SCS among BWPs of the RF carrier.

Turning now to the CSI scenario, according to an additional aspect of the disclosure, a BS may determine a preparation time for a CSI transmission by modifying a preparation time calculation to account for a transmission mode switch. For example, a defined value may be added to Equation 2 to account for the switching time. Two example modifications of Equation 2 are shown in Equation 5 and, alternatively, in Equation 6:

$$T_{proc,CSI,CC1}(Z+=\text{switch\_time})(2048+144) \cdot \kappa 2^{-\mu} \cdot T_C \quad \text{EQUATION 5}$$

$$T_{proc,CSI,CC1}=(Z)(2048+144) \cdot \kappa 2^{-\mu} \cdot T_C + \text{switch\_time} \quad \text{EQUATION 6}$$

In Equations 5 and 6, the parameter switch_time is a defined value (e.g., a constant) that is used to account for the switching time. In some examples, μ in Equations 5 and 6 is calculated as min($\mu_{PDCCH}$, $\mu_{CSI-RS}$, $\mu_{UL}$) where $\mu_{UL}$ is the lowest SCS among BWPs of the carrier. In some aspects, the parameter Z may be as defined as in Tables 5 and 6 above. In some examples, the parameter Z could represent a parameter $T_{proc,CSI}$.

Figure 7:
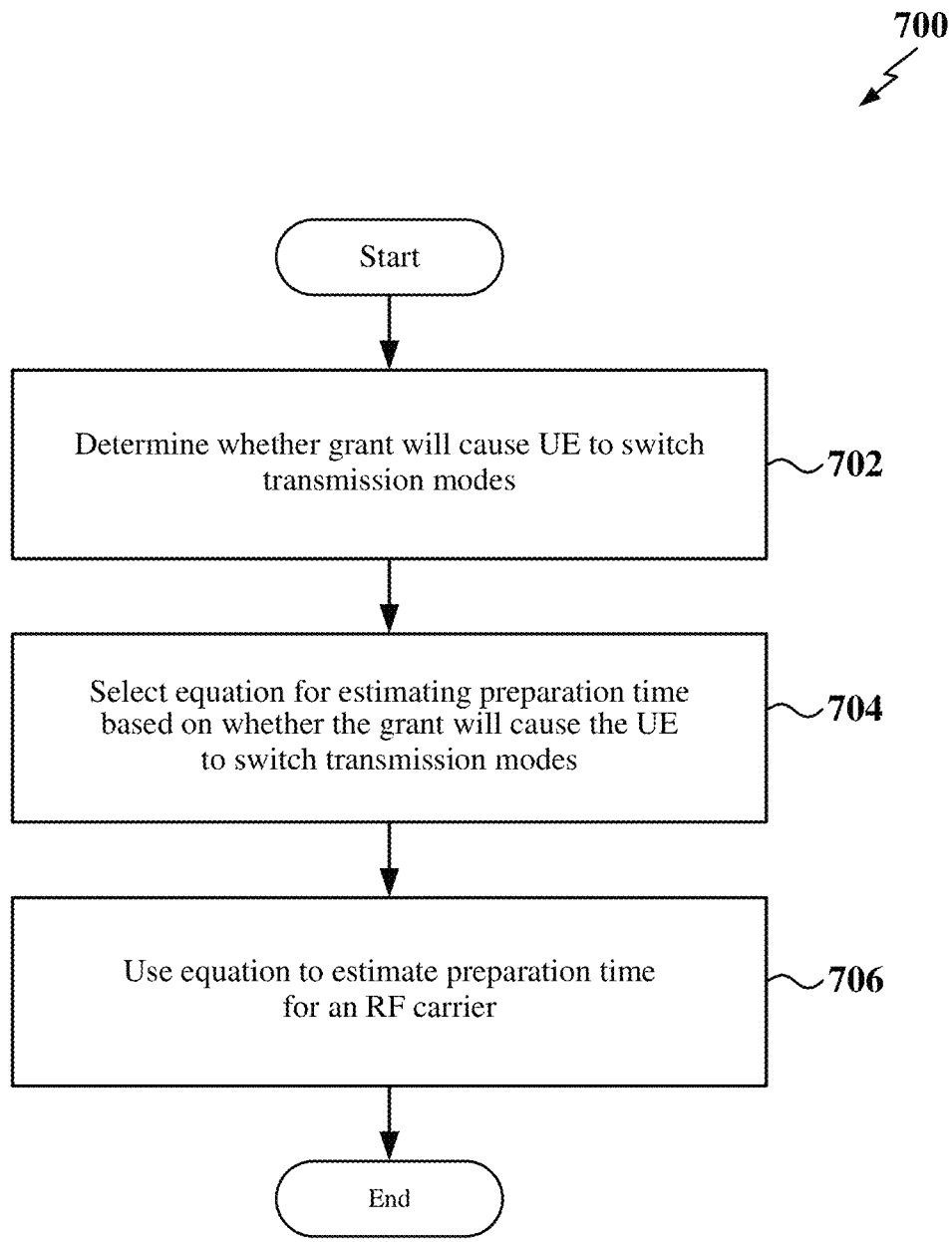
FIG. 7 is a flow chart that shows a BS determining a preparation time by adding a default value to a preparation time calculation according to some aspects.

FIG. 7 is a flow chart of a method 700 where a BS may determine a preparation time by adding a default value to a preparation time calculation according to some aspects. As described herein, some or all illustrated features may be omitted in a particular implementation within the scope of the present disclosure, and some illustrated features may not be required for implementation of all examples. In some examples, the method 700 may be carried out by the BS 1000 illustrated in FIG. 10 (e.g., by the processing system 1014). In some examples, the method 700 may be carried out by any suitable apparatus or means for carrying out the functions or algorithm described below.

At block 702, a BS may determine whether a grant will cause a UE to switch transmission modes. For example, the BS may determine whether the grant will cause the UE to switch from case 1 to case 2 of FIG. 6, or vice versa.

At block 704, the BS may select an equation for estimating a preparation time based on whether the grant will cause the UE to switch transmission modes. For example, if the grant will cause the UE to switch transmission modes, the BS may select Equation 4 (for a PUSCH transmission) or Equation 6 (for a CSI transmission), or take other action to increase the preparation time to account for the transmission mode switch. On the other hand, if the grant will not cause the UE to switch transmission modes, the BS may select another equation (e.g., an equation without the switch_time parameter such as Equation 1 for PUSCH or Equation 2 for CSI), or set to the value of the switch_time parameter to zero (0) for Equation 4 or Equation 6, or take other action to determine a preparation time that does not account for a transmission mode switch.

At block 706, the BS may use the equation selected at block 704 to estimate the preparation time for a transmission on an RF carrier. For example, if the grant will cause the UE to switch transmission modes, the BS may use Equation 4 for PUSCH or Equation 6 for CSI to estimate the preparation time.

The preparation time for a UE to transmit on a first RF carrier may be different from the preparation time for the UE to transmit on a second RF carrier. For example, transmissions on the first RF carrier may use a first sub-RF carrier spacing (SCS), while transmissions on the second RF carrier may use a second SCS that is different from the first SCS. This difference in SCS may affect the amount of time it takes the UE to prepare for a transmission (e.g., an uplink preparation time).

As noted above, different SCSs may be associated with different SCS indexes (μ). For example, an SCS of 15 kHz may be associated with an SCS index of zero (0), an SCS of 30 kHz may be associated with an SCS index of one (1), an SCS of 60 kHz may be associated with an SCS index of two (2), and so on.

According to an additional aspect of the disclosure, a BS may estimate a preparation time for at least one uplink transmission by a UE by selecting the smallest subcarrier spacing (SCS) index of different RF carriers and using the selected SCS index in a preparation time calculation. In some implementations, a BS may determine an SCS index from the SCS indexes for a first RF carrier and a second RF carrier that results in the BS calculating the longer preparation time for at least one uplink transmission. For example, the BS may select the lowest SCS index from a first SCS index for the first RF carrier and a second SCS index for the second RF carrier. The BS then calculates a preparation time based on the selected SCS index. In this way, the preparation time determined (estimated) by the BS may be long enough to enable the UE to prepare for a transmission on either RF carrier or both RF carriers. This technique is applicable to PUSCH transmissions, CSI transmissions, and other types of transmissions.

For a PUSCH transmission, Equation 1 (not including a constant to account for the switching time) or Equation 3 or 4 (including a constant to account for the switching time) may be used to calculate the PUSCH preparation time (e.g., uplink processing time) $T_{proc,2}$ in some implementations. In an example where CC1 has a 15 kHz SCS (e.g., µ=zero (0)) and CC2 has a 30 kHz SCS (e.g., µ=one (1)), a value of zero (0) (the lower of zero (0) and one (1)) may be used for p in the equation. In this way, the calculated preparation time may be long enough to enable the UE to prepare for a PUSCH transmission on either RF carrier or both RF carriers.

For a CSI transmission, Equation 2 (not including a constant to account for the switching time) or Equation 5 or 6 (including a constant to account for the switching time) may be used to calculate the CSI preparation time (e.g., uplink processing time) $T_{proc,CSI}$ in some implementations. Again, a value of zero (0) (the lower of zero (0) and one (1)) may be used for µ in the equation in an example where CC1 has a 15 kHz SCS (e.g., µ=zero (0)) and CC2 has a 30 kHz SCS (e.g., µ=one (1)). In this way, the calculated preparation time may be long enough to enable the UE to prepare for a CSI transmission on either RF carrier or both RF carriers.

Thus, the disclosure relates in some aspects to determining a preparation time that is sufficiently long to enable the UE to prepare for the uplink transmission(s) by selecting a value for µ that takes both carriers into account. This may ensure that the selected value will provide the UE with sufficient time on each carrier. For example, as discussed above, the selection of p may be based on the lower SCS of the SCS for the CC1 UL and the SCS for the CC2 UL.

In some examples, for a PUSCH transmission, µ may correspond to the one of ($µ_{DL}$, $µ_{UL}$) resulting with the largest $T_{proc,2}$, where the $µ_{DL}$ corresponds to the subcarrier spacing of the downlink with which the PDCCH carrying the DCI scheduling the PUSCH was transmitted. In addition, taking both UL carriers into account, $µ_{UL}$ corresponds to the subcarrier spacing of the lower one between the lowest value among all the UL BWPs of carrier 1 and the lowest value among all the UL BWPs of carrier 2.

In some examples, for a CSI transmission, µ corresponds to the min ($µ_{PDCCH}$, $µ_{CSI-RS}$, $µ_{UL}$) where the $µ_{PDCCH}$ corresponds to the subcarrier spacing of the PDCCH with which the DCI was transmitted. In addition, taking both UL carriers into account, $µ_{UL}$ corresponds to the subcarrier spacing of the lower one between the lowest value among all the UL BWPs of carrier 1 and the lowest value among all the UL BWPs of carrier 2. Also, $µ_{CSI-RS}$ corresponds to the minimum subcarrier spacing of the aperiodic CSI-RS triggered by the DCI.

Figure 8:
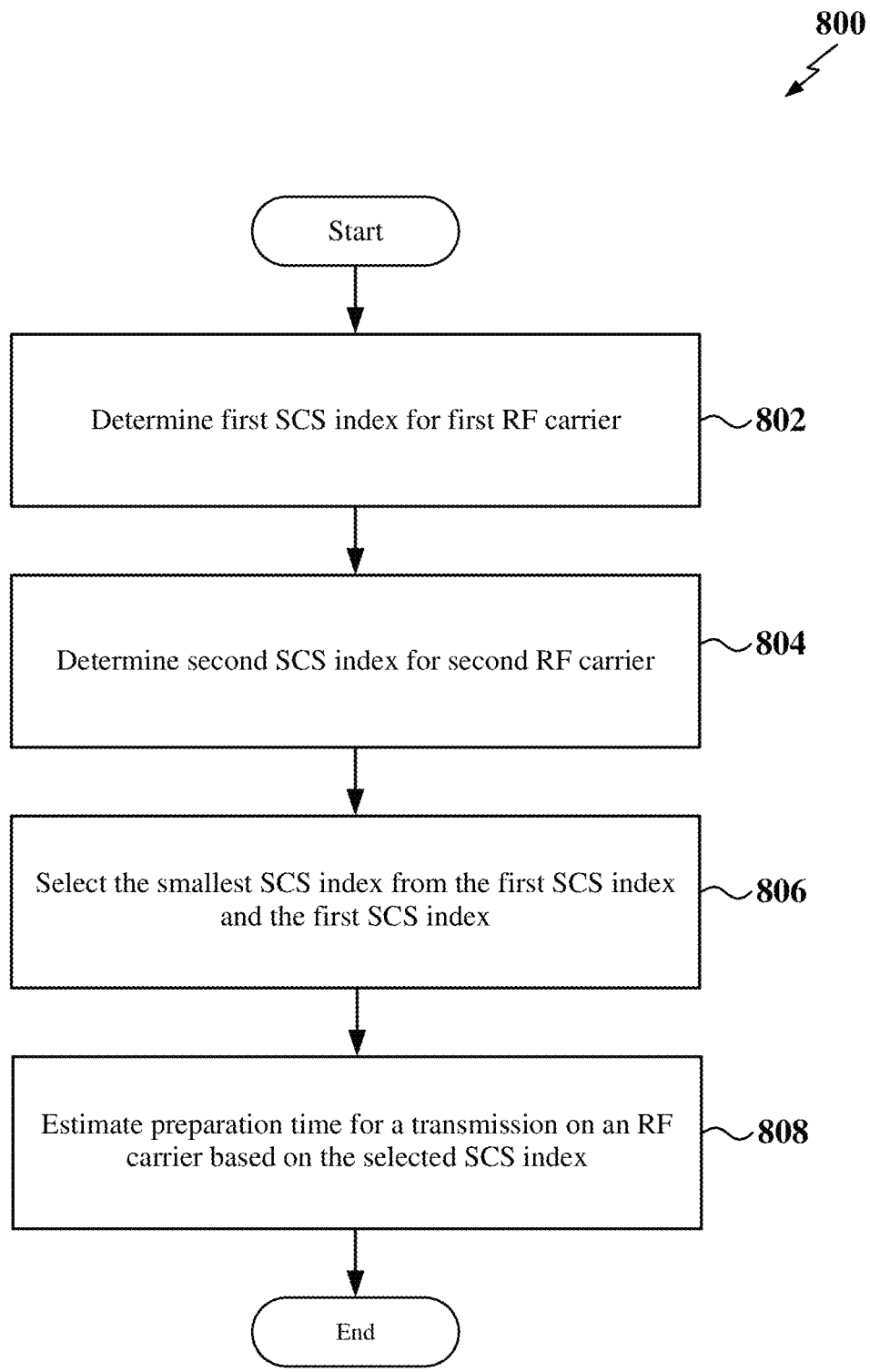
FIG. 8 is a flow chart that shows a BS determining a preparation time by selecting a smallest subcarrier spacing (SCS) for a preparation time calculation according to some aspects.

FIG. 8 is a flow chart of a method 800 that shows a BS determining a preparation time by selecting a smallest subcarrier spacing (SCS) for a preparation time calculation according to some aspects. As described herein, some or all illustrated features may be omitted in a particular implementation within the scope of the present disclosure, and some illustrated features may not be required for implementation of all examples. In some examples, the method 800 may be carried out by the BS 1000 illustrated in FIG. 10 (e.g., by the processing system 1014). In some examples, the method 800 may be carried out by any suitable apparatus or means for carrying out the functions or algorithm described below.

At block 802, a BS may determine a first SCS index for a first RF carrier. For example, as discussed above, the BS may identify the lowest SCS index used among all BWPs of the first carrier.

At block 804, the BS may determine a second SCS index for a second RF carrier. For example, as discussed above, the BS may identify the lowest SCS index used among all BWPs of the second carrier.

At block 806, the BS may select the smallest SCS index from the first SCS index and the second SCS index. For example, if the first SCS index is zero (0) and the second SCS index is one (1), the BS selects the first SCS index.

At block 808, the BS may estimate the preparation time for a transmission on an RF carrier based on the selected SCS index. In some implementations, the BS may incorporate the selected SCS index (the µ parameter) into Equation 1, 3, or 4 and execute the equation to calculate $T_{proc,2}$ (the preparation time to use for sending a grant for a PUSCH transmission). In some implementations, the BS may incorporate the selected SCS index (the µ parameter) into Equation 2, 5, or 6 and execute the equation to calculate $T_{proc,CSI}$ (the preparation time to use for sending a grant for a CSI transmission).

According to an additional aspect of the disclosure, a BS may determine a preparation time for at least one uplink transmission on multiple RF carriers based on a calculated preparation time for each RF carrier. For example, to obtain a preparation time that is sufficiently long to enable the UE to prepare for an uplink transmission(s) by the UE on either carrier, the determination of the preparation time may involve selecting the longest preparation time of the calculated preparation times for the RF carriers. This technique is applicable to PUSCH transmissions, CSI transmissions, and other types of transmissions.

For example, for a PUSCH transmission, a BS may determine a first preparation time for a first RF carrier and a second preparation time for a second RF carrier and then select the longest preparation time to control when a grant for the PUSCH transmission is transmitted. In this way, the preparation time determined (estimated) by the BS will be long enough to enable the UE to prepare for a PUSCH transmission on either RF carrier or both RF carriers.

As a specific example, CC1 and CC2 may have different processing times (e.g., CC1 and CC2 may have different SCSs). For example, CC1 may have a 15 kHz SCS while CC2 may have a 30 kHz SCS. Equation 1 (not including a constant to account for the switching time) or Equation 3 or 4 (each including a constant to account for the switching time) may be used to calculate the uplink preparation time (e.g., uplink processing time $T_{proc,2}$) for each CC. That is, an uplink preparation time $T_{proc,2,CC1}$ is calculated for CC1 and an uplink preparation time $T_{proc,2,CC2}$ is calculated for CC2. Equation 7 below may then be used to select the longer of $T_{proc,2,CC2}$ and $T_{proc,2,CC2}$:

$$T_{proc,CSI}=\max(T_{proc,CSI,CC1},T_{proc,CSI,CC2}) \quad \text{EQUATION 7}$$

Similarly, for a CSI transmission, a BS may determine a first preparation time for the first RF carrier and a second preparation time for the second RF carrier and then select the longest preparation time to control when a grant for the CSI transmission is transmitted. In this way, the preparation time determined (estimated) by the BS will be long enough to enable the UE to prepare for a CSI transmission on either RF carrier or both RF carriers.

As a specific example, CC1 and CC2 may have different CSI-related processing times. Equation 2 (not including a constant to account for the switching time) or Equation 5 or 6 (each including a constant to account for the switching time) may be used to calculate the uplink preparation time (e.g., uplink processing time $T_{proc,CSI}$) for each CC. That is, using Equation 2, 5, or 6, a preparation time $T_{proc,CSI,CC1}$ is calculated for CC1 and a preparation time $T_{proc,CSI,CC2}$ is calculated for CC2. Equation 8 may then be used to select the longer of $T_{proc,CSI,CC2}$ and $T_{proc,CSI,CC2}$:

$$T_{proc,CSI}=\max(T_{proc,CSI,CC1},T_{proc,CSI,CC2}) \quad \text{EQUATION 8}$$

Figure 9:
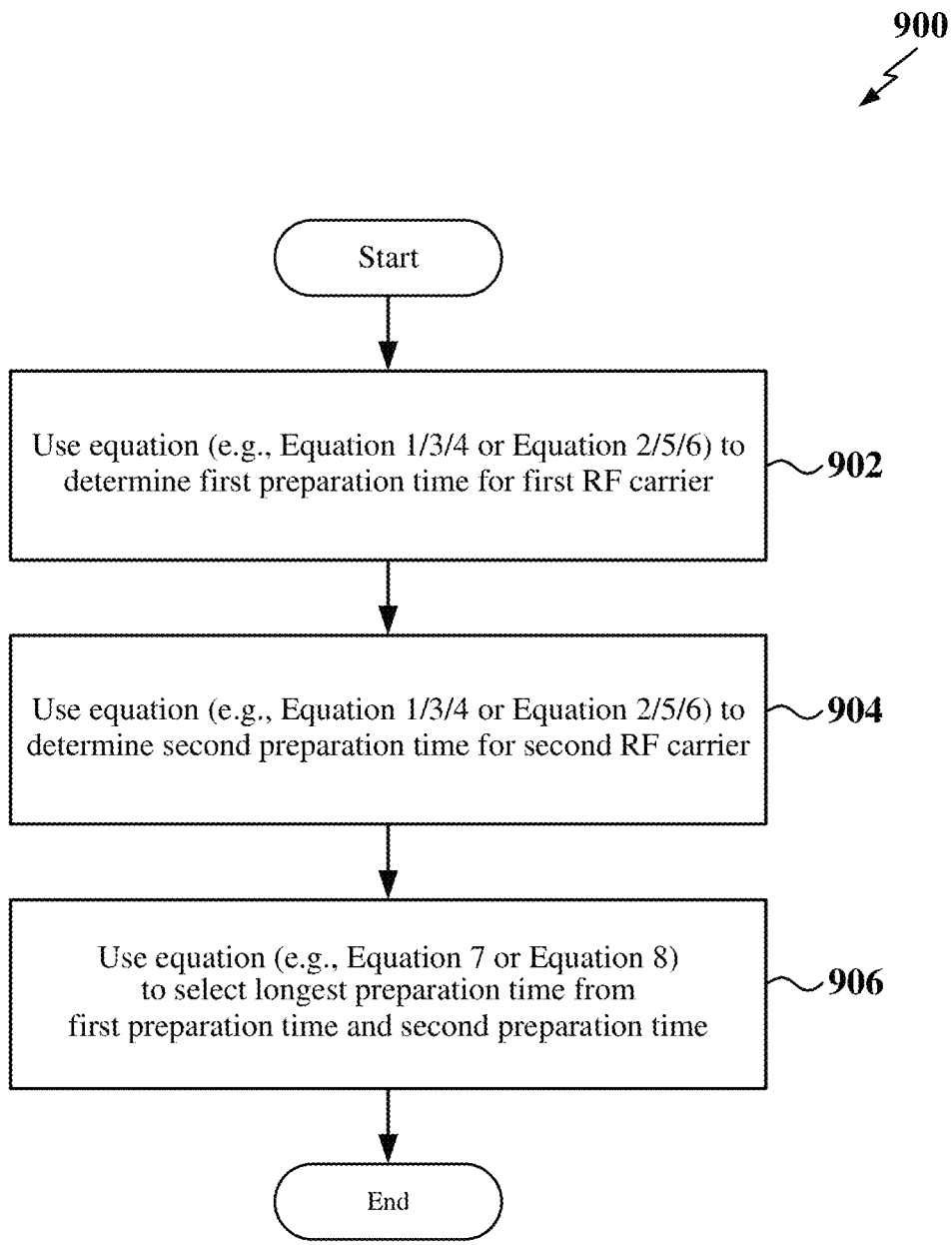
FIG. 9 is a flow chart that shows a BS determining a preparation time by selecting the larger of two preparation times according to some aspects.

FIG. 9 is a flow chart of a method 900 that shows a BS determining a preparation time by selecting the larger of two preparation times according to some aspects. As described herein, some or all illustrated features may be omitted in a particular implementation within the scope of the present disclosure, and some illustrated features may not be required for implementation of all examples. In some examples, the method 900 may be carried out by the BS 1000 illustrated in FIG. 10 (e.g., by the processing system 1014). In some examples, the method 900 may be carried out by any suitable apparatus or means for carrying out the functions or algorithm described below.

At block 902, a BS may use a first equation to determine a first preparation time for a first RF carrier. For example, the BS may use Equation 1, 3, or 4 to calculate a preparation time for a PUSCH transmission on a first component carrier. As another example, the BS may use Equation 2, 5 or 6 to calculate a preparation time for a CSI transmission on a first component carrier.

At block 904, the BS may use the first equation to determine a second preparation time for a second RF carrier. For example, the BS may use Equation 1, 3, or 4 to calculate a preparation time for a PUSCH transmission on a second component carrier. As another example, the BS may use Equation 2, 5 or 6 to calculate a preparation time for a CSI transmission on a second component carrier.

At block 906, the BS may use a second equation to select the longest preparation time from the first preparation time and the second preparation time. For example, the BS may use Equation 7 to determine the preparation time to use for sending a grant for a PUSCH transmission. As another example, the BS may use Equation 8 to determine the preparation time to use for sending a grant for a CSI transmission.

According to an additional aspect of the disclosure, a BS (e.g., a gNB) may ensure that there is enough time for a transmission mode switch at the UE. This technique is applicable, for example, to Tproc,2 for PUSCH and $T_{proc,CSI}$ for CSI.

For example, Tproc,2 for PUSCH and Tproc,2 for transmit switching may be different. In this case, the BS may ensure that no switching is triggered if the transmission of the PUSCH grant would meet the preparation time requirement for Tproc,2 for PUSCH but not Tproc,2 for switching. For example, upon determining that both preparation time requirements would not be met if a grant that results in a transmission mode switch at the UE was sent, the BS may elect to instead send a different grant that does not result in a transmission mode switch at the UE.

As another example, $T_{proc,CSI}$ for CSI computation and $T_{proc,CSI}$ for transmit switching may be different. In this case, the BS may ensure that no switching is triggered if the transmission of the PUSCH grant for CSI would meet the preparation time requirement for $T_{proc,CSI}$ for CSI computation but not $T_{proc,CSI}$ for transmit switching. For example, upon determining that both preparation time requirements would not be met if a grant that results in a transmission mode switch at the UE was sent, the BS may elect to instead send a different grant that does not result in a transmission mode switch at the UE.

According to an additional aspect of the disclosure, a UE may be configured to process a received grant within a preparation time. For example, the UE may estimate the minimum preparation time needed for receiving a grant. This preparation time may include, for example, any one or more of the amount of time it takes the UE to decode a grant, the amount of time it takes the UE to generate a transmission, the amount of time it takes the UE to switch between transmission modes, or the amount of time the UE will wait for a valid transmission time in a transmission pipeline. After estimating the preparation time, the UE may configure at least one component to ensure that the UE is able to process a received grant prior to the transmission time (e.g., a slot) specified by the grant. For example, the UE may adjust the frequency of a clock that controls the rate at which the UE performs receive operations. As another example, the UE may adjust a memory allocation to enable the UE to more quickly process received information.

In some examples, a UE does not expect to receive an uplink grant indicating at least one uplink transmission on a first RF carrier earlier than an adjusted uplink preparation time (e.g., a preparation time adjusted by a switch_time parameter as discussed herein). For example, a UE may be configured to not expect to receive an uplink grant (that schedules an uplink RF carrier switch) that does not satisfy the corresponding uplink preparation time.

The techniques described herein may be implemented in a variety of wireless communication architectures and configurations. For example, in some implementations, a BS and a UE may employ a carrier aggregation (CA) scheme where the BS and the UE communicate via several CCs. In this case, if the BS sends a grant to the UE that results in the UE switching from one transmission mode to another (i.e., switching from transmitting on one CC to transmitting on another CC), the BS may estimate the preparation time for a UE transmission on at least one of the CCs using the techniques describe herein. In some examples, such a CA scheme may be implemented using one of two options. The first option (CA option 1) does not allow simultaneous transmission on CC1 and CC2. For example, in CA option 1, case 1 of option 2 of Table 2 might not be allowed. The second option (CA option 2) allows simultaneous transmission on CC1 and CC2. For example, in CA option 2, case 1 of option 2 of Table 2 is allowed.

In some implementations, a BS and a UE may employ an SUL scheme where the BS and the UE communicate via several (e.g., two) uplink carriers. In this case, if the BS sends a grant to the UE that results in the UE switching from one transmission mode to another (i.e., switching from transmitting on one uplink carrier to transmitting on another uplink carrier), the BS may estimate the preparation time for a UE transmission on at least one of the uplink carriers using the techniques describe herein. In some examples, such an SUL scheme does not allow simultaneous transmission on multiple uplink carriers. For example, case 1 of option 2 of Table 2 might not be allowed.

The RF carriers (e.g., CCs) described herein may take different forms in different examples. In some examples, all of the RF carriers may be sub-6 GHz carriers. In some examples, the RF carriers may be sub-6 GHz carriers and/or millimeter wave (mmW) carriers. For example, a first RF carrier may be a sub-6 GHz carrier and a second RF carrier may be a mmW carrier. As another example, all of the RF carriers may be mmW carriers.

The above techniques are not limited to two-carrier systems. Rather, the techniques described herein may be applicable to multi-carrier systems in general (e.g., more than 2 CCs). For example, in some implementations, a BS and a UE may employ a CA scheme where the BS and the UE communicate via several (e.g., three or more) CCs. In this case, if the BS sends a grant to the UE that results in the UE switching from one transmission mode to another (i.e., switching from transmitting on a first CC to transmitting on a second CC), the BS may estimate the preparation time for a UE transmission on at least one of these two CCs using the techniques describe herein.

Figure 10:
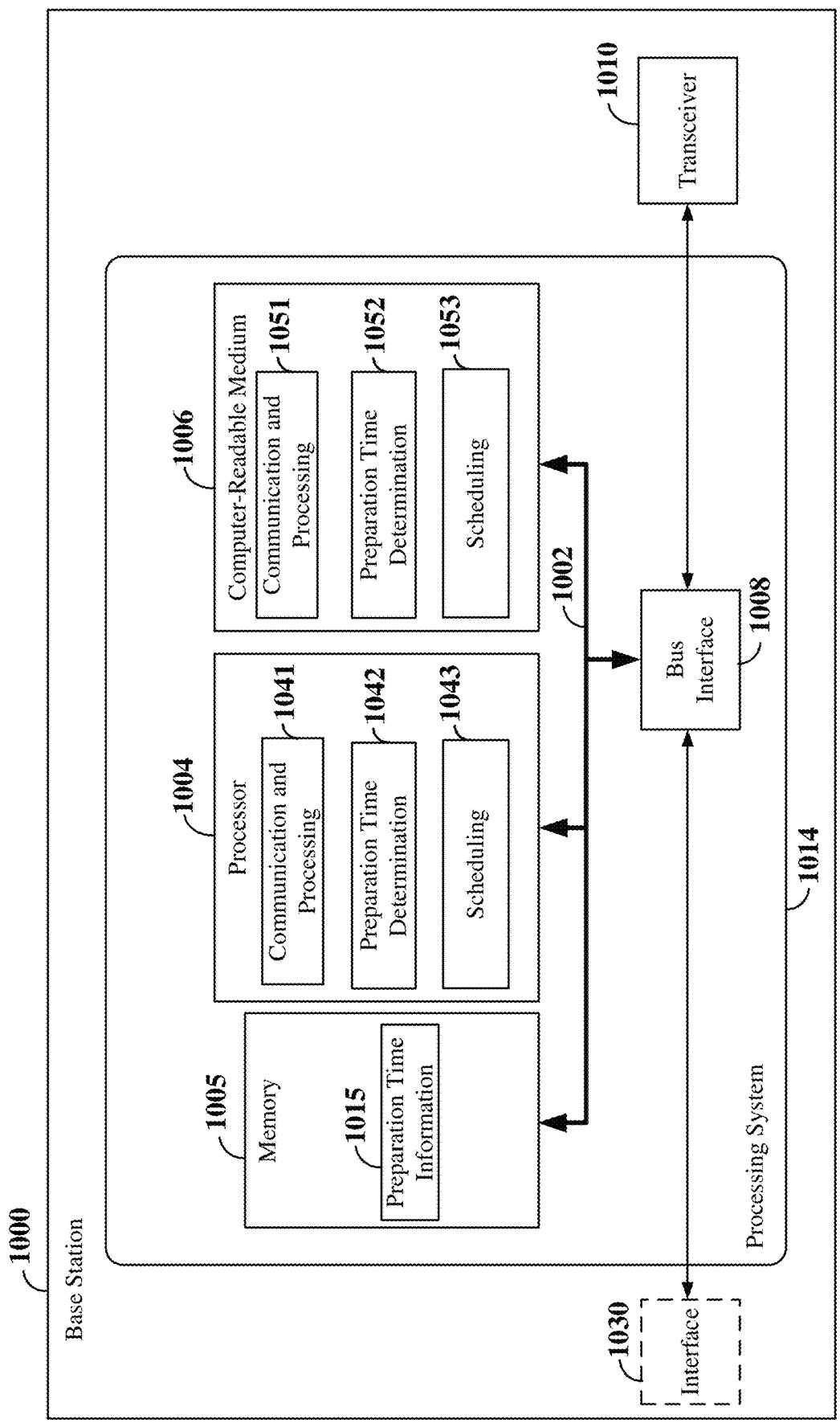
FIG. 10 is a block diagram conceptually illustrating an example of a hardware implementation for a base station employing a processing system according to some aspects.

FIG. 10 is a block diagram conceptually illustrating an example of a hardware implementation for a base station (BS) 1000 employing a processing system 1014 according to some aspects. In some implementations, the BS 1000 may correspond to any of the BSs (e.g., gNBs) or scheduling entities shown in any of FIGS. 1, 2, 4, and 5.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the BS 1000 may be configured to perform any one or more of the functions described herein. That is, the processor 1004, as utilized in a BS 1000, may be used to implement any one or more of the processes and procedures described herein.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. The interface 1030 (e.g., a network interface and/or a user interface) provides a communication interface or means of communicating with various other apparatus and devices (e.g., other devices housed within the same apparatus as the BS 1000 or an external apparatus) over an internal bus or external transmission medium, such as an Ethernet cable.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store preparation time information 1015 (e.g., a calculated preparation time and/or information used to calculate a preparation time) used by the processor 1004 for scheduling-related operations as described herein.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The BS 1000 may be configured to perform any one or more of the operations described herein (e.g., as described above in conjunction with FIGS. 1-9 and as described below in conjunction with FIGS. 11-16). In some aspects of the disclosure, the processor 1004, as utilized in the BS 1000, may include circuitry configured for various functions.

The processor 1004 may be configured to generate, schedule, and modify a resource assignment or grant of time-frequency resources (e.g., a set of one or more resource elements). For example, the processor 1004 may schedule time-frequency resources within a plurality of time division duplex (TDD) and/or frequency division duplex (FDD) subframes, slots, and/or mini-slots to carry user data traffic and/or control information to and/or from multiple UEs. The processor 1004 may be configured to schedule resources for the transmission of downlink signals. The processor 1004 may further be configured to schedule resources for the transmission of uplink signals.

The processor 1004 may include communication and processing circuitry 1041. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains. The communication and processing circuitry 1041 may further be configured to execute communication and processing software 1051 included on the computer-readable medium 1006 to implement one or more functions described herein.

In some implementations where the communication involves receiving information, the communication and processing circuitry 1041 may obtain information from a component of the BS 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., means for transmitting). In some examples, the communication and processing circuitry 1041 may include functionality for a means for encoding.

The processor 1004 may include preparation time determination circuitry 1042 configured to perform preparation time determination-related operations as discussed herein (e.g., as discussed above in conjunction with FIGS. 6-9). The preparation time determination circuitry 1042 may further be configured to execute preparation time determination software 1052 included on the computer-readable medium 1006 to implement one or more functions described herein.

The preparation time determination circuitry 1042 may include functionality for a means for determining (e.g., calculating) a preparation time. For example, the preparation time determination circuitry 1042 may use a defined value (e.g., switch_time) in the calculation of a preparation time $T_{proc,2}$ or $T_{proc,CSI}$ (e.g., as described above in conjunction with Equations 2, 3, 4, and 5).

The preparation time determination circuitry 1042 may include functionality for a means for determining a minimum SCS index. For example, the preparation time determination circuitry 1042 may determine a first $\mu$ parameter for a first component carrier and determine a second $\mu$ parameter for a second component carrier (e.g., by determining a lowest $\mu$ of all BWPs of each RF carrier). The preparation time determination circuitry 1042 may then identify the shortest $\mu$ parameter from the first $\mu$ parameter for a first component carrier and the second $\mu$ parameter for a second component carrier (e.g., $\mu_{min}=\min(\mu_1, \mu_2)$).

In some examples, the preparation time determination circuitry 1042 may provide a means to use a defined value (e.g., switch_time) in the calculation of a preparation time such as $T_{proc,2}$ or $T_{proc,CSI}$ (e.g., as described above in conjunction with Equations 2, 3, 4, and 5). The use of this defined value may result in an increase of the preparation time (e.g., by a factor based on the defined value).

In some examples, the preparation time determination circuitry 1042 may provide a means to determine a $\mu$ parameter for a first component carrier and determine a $\mu$ parameter for a second component carrier. In some examples, the preparation time determination circuitry 1042 may provide a means to identify the shortest $\mu$ parameter from a first $\mu$ parameter for a first component carrier and a second $\mu$ parameter for a second component carrier (e.g., $\mu_{min}=\min(\mu_1, \mu_2)$). In some examples, the preparation time determination circuitry 1042 may provide a means to use Equation 1 or 4 to calculate $T_{proc,2}$. In some examples, the preparation time determination circuitry 1042 may provide a means to use Equation 2 or 6 to calculate $T_{proc,CSI}$.

In some examples, the preparation time determination circuitry 1042 may provide a means to determine the $T_{proc,2}$ parameter for a first component carrier, for a second component carrier, or for each of a first component carrier and a second component carrier. In some examples, the preparation time determination circuitry 1042 may provide a means to identify the shortest $T_{proc,2}$ parameter from a first $T_{proc,2}$ parameter for a first component carrier and a second $T_{proc,2}$ parameter for a second component carrier (e.g., $T_{proc,2}=\max(T_{proc,2,CC1}, T_{proc,2,CC2})$). In some examples, the preparation time determination circuitry 1042 may provide a means to identify the shortest $T_{proc,CSI}$ parameter from a first $T_{proc,CSI}$ parameter for a first component carrier and a second $T_{proc,CSI}$ parameter for a second component carrier (e.g., $T_{proc,CSI}=\max(T_{proc,CSI,CC1}, T_{proc,CSI,CC2})$).

The processor 1004 may include scheduling circuitry 1043 configured to perform scheduling-related operations as discussed herein (e.g., as discussed above in conjunction with FIGS. 6-9). The scheduling circuitry 1043 may further be configured to execute scheduling software 1053 included on the computer-readable medium 1006 to implement one or more functions described herein.

The scheduling circuitry 1043 may include functionality for a means for transmitting a grant. For example, the scheduling circuitry 1043 may generate a DCI including a grant that schedules an uplink transmission by a UE. The scheduling circuitry 1043 may then cause the communication and processing circuitry 1041 and the transceiver 1010 to transmit the DCI to the UE on a designated channel (e.g., a PDCCH or a PDSCH). In some examples, the scheduling circuitry 1043 may provide a means to transmit a grant (e.g., a DCI including a grant) to the UE a sufficient amount of time (based on the adjusted preparation time) before the UE is to transmit at least one transmission.

Figure 11:
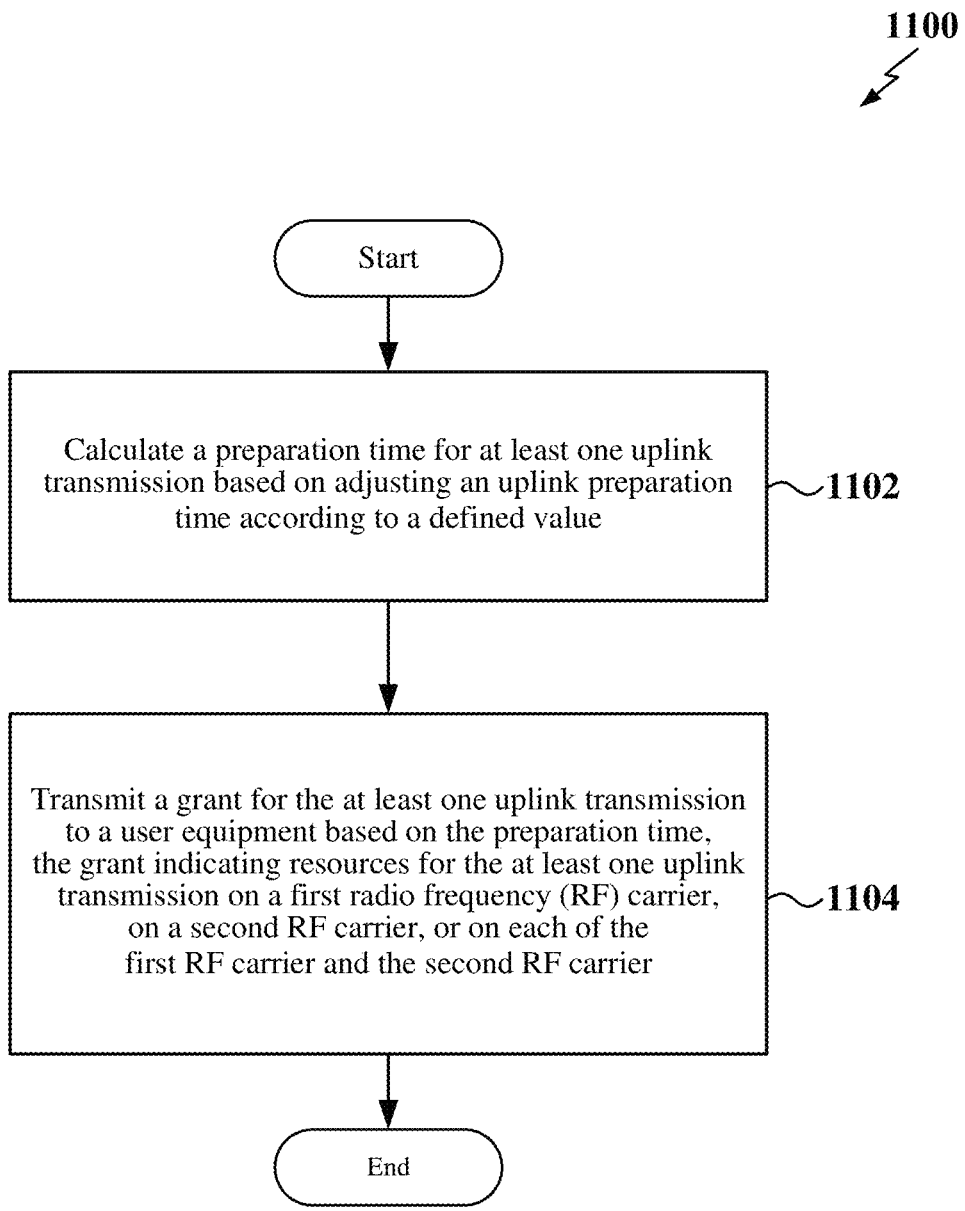
FIG. 11 is a flow chart illustrating an example wireless communication method for scheduling a UE based on an adjusted uplink preparation time according to some aspects.

FIG. 11 is a flow chart illustrating an example wireless communication method 1100 for scheduling a UE based on an adjusted uplink preparation time according to some aspects. As described herein, some or all illustrated features may be omitted in a particular implementation within the scope of the present disclosure, and some illustrated features may not be required for implementation of all examples. In some examples, the method 1100 may be carried out by the BS 1000 (e.g., by the processing system 1014) illustrated in FIG. 10. In some examples, the method 1100 may be carried out by any suitable apparatus or means for carrying out the functions or algorithm described below.

At block 1102, a BS may calculate a preparation time for at least one uplink transmission based on adjusting an uplink preparation time according to a defined value. For example, the preparation time determination circuitry 1042, shown and described above in connection with FIG. 10, may provide a means to calculate a preparation time for at least one uplink transmission based on adjusting an uplink preparation time according to a defined value.

In some examples, to adjust the uplink preparation time according to the defined value, the BS may increase the uplink preparation time by a constant value. In some examples, to adjust the uplink preparation time according to the defined value, the BS may increase the uplink preparation time by a constant value for uplink carrier aggregation of the first RF carrier and the second RF carrier. In some examples, the at least one uplink transmission may include at least one channel state information (CSI) transmission and/or at least one physical uplink shared channel (PUSCH) transmission.

In some examples, the BS may calculate the preparation time by determining a minimum SCS index based on a first subcarrier spacing (SCS) index for the first RF carrier and a second SCS index for the second RF carrier and calculating the preparation time based on the minimum SCS index. In some examples, to determine the minimum SCS index based on the first SCS index for the first RF carrier and the second SCS index for the second RF carrier comprises, the BS may select a lowest SCS index from the first SCS index and the second SCS index. In some examples, to calculate the preparation time based on the minimum SCS index, the BS may select a first parameter based on the minimum SCS index and calculate the preparation time based on the first parameter. In some examples, the first parameter specifies a quantity of symbols.

In some examples, the uplink preparation time is based on a first parameter (e.g., Z for CSI or $N_2$ for PUSCH) and a constant value. In some examples, the BS may calculate the preparation time by adding the defined value to the uplink preparation time. In some examples, the first parameter specifies a quantity of symbols.

At block 1104, the BS may transmit a grant for the at least one uplink transmission to a user equipment based on the preparation time, the grant indicating resources for the at least one uplink transmission on a first radio frequency (RF) carrier, on a second RF carrier, or on each of the first RF carrier and the second RF carrier. For example, the scheduling circuitry 1043 in cooperation with the communication and processing circuitry 1041 and the transceiver 1010, shown and described above in connection with FIG. 10, may provide a means to transmit a grant for the at least one uplink transmission to a user equipment based on the preparation time.

In some examples, the grant may indicate resources for the at least one uplink transmission on a single RF carrier (e.g., the first RF carrier or the second RF carrier). Alternatively, the grant may indicate resources for the at least one uplink transmission on the first RF carrier and on the second RF carrier.

In some examples, the resources for the at least one uplink transmission may commence at a first time. In this case, to transmit the grant for the at least one uplink transmission to the UE based on the adjusted preparation time, the UE may transmit the grant to the UE at a second time that precedes the first time by at least the maximum preparation time.

In some examples, the grant may be configured to trigger a switch by the UE between operating in a first uplink transmission mode and operating in a second uplink transmission mode. In some examples, the defined value is greater than zero if the switch by the user equipment between operating in the first uplink transmission mode and operating in the second uplink transmission mode takes place at the first time. In some examples, the defined value is zero if the switch by the user equipment between operating in the first uplink transmission mode and operating in the second uplink transmission mode does not take place at the first time.

Figure 12:
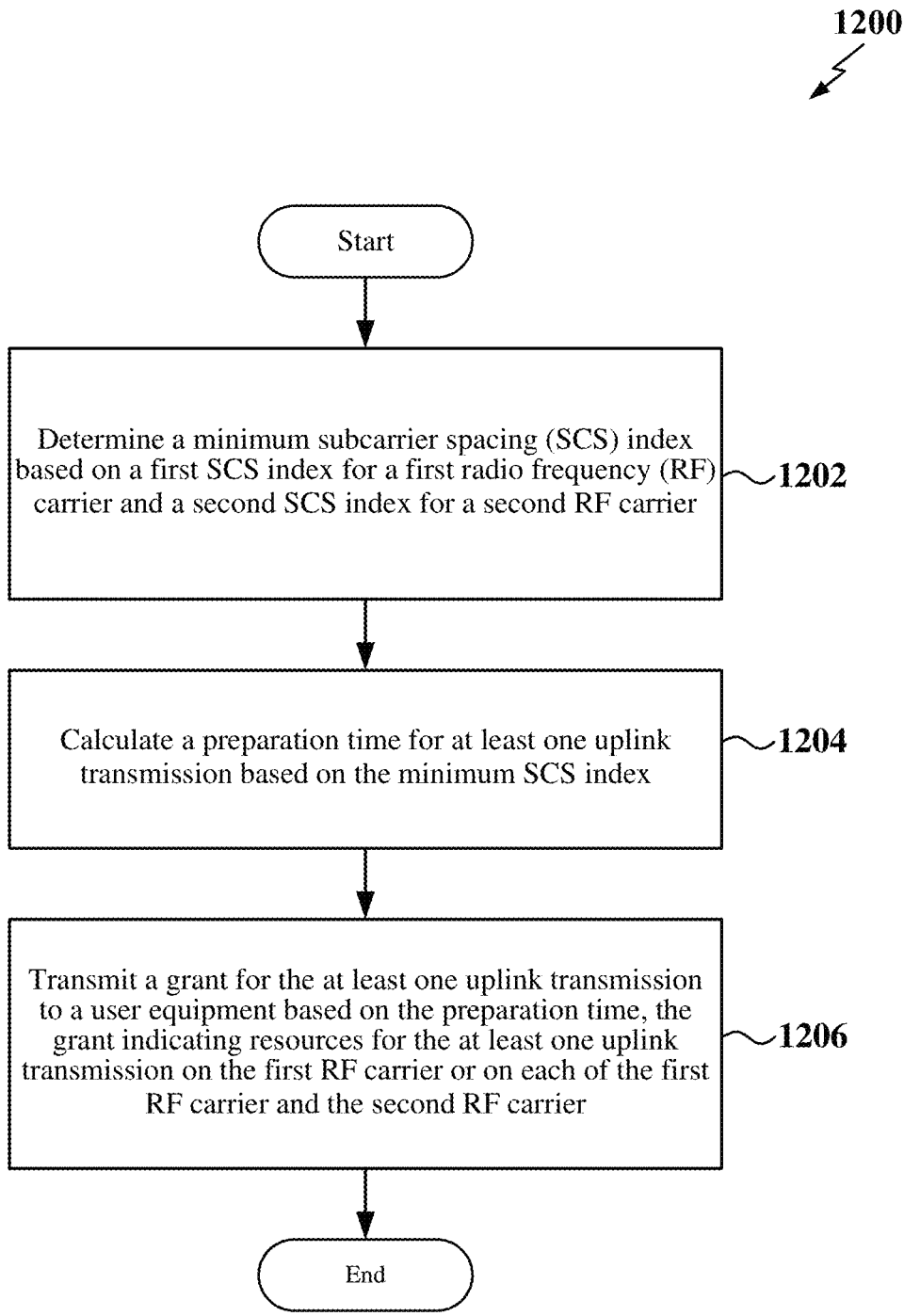
FIG. 12 is a flow chart illustrating an example wireless communication method for scheduling a UE based on a selection of a minimum SCS index according to some aspects.

FIG. 12 is a flow chart illustrating an example wireless communication method 1200 for scheduling a UE based on a selection of a minimum SCS index according to some aspects. As described herein, some or all illustrated features may be omitted in a particular implementation within the scope of the present disclosure, and some illustrated features may not be required for implementation of all examples. In some examples, the method 1200 may be carried out by the BS 1000 (e.g., by the processing system 1014) illustrated in FIG. 10. In some examples, the method 1200 may be carried out by any suitable apparatus or means for carrying out the functions or algorithm described below.

At block 1202, a BS may determine a minimum subcarrier spacing (SCS) index based on a first SCS index for a first radio frequency (RF) carrier and a second SCS index for a second RF carrier. For example, the preparation time determination circuitry 1042, shown and described above in connection with FIG. 10, may provide a means to determine a minimum SCS index based on a first SCS index for a first RF carrier and a second SCS index for a second RF carrier. In some examples, the BS may determine the first SCS index for the first RF carrier by determining a lowest SCS of all bandwidth parts (BWPs) of the first RF carrier. In some examples, to determine the minimum SCS index based on the first SCS index and the second SCS index, the BS may select the lowest of the first SCS index or the second SCS index.

In some examples, to determine the minimum SCS index based on the first SCS index for the first RF carrier and the second SCS index for the second RF carrier, the BS may select a lowest SCS index from the first SCS index and the second SCS index.

At block 1204, the BS may calculate a preparation time [e.g., $T_{proc,2}$] for at least one uplink transmission based on the minimum SCS index. For example, the preparation time determination circuitry 1042, shown and described above in connection with FIG. 10, may provide a means to calculate a preparation time for at least one uplink transmission based on the minimum SCS index. In some examples, the BS may determine the preparation time by estimating any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time.

In some examples, to calculate the preparation time for at least one uplink transmission based on the minimum SCS index, the BS may select a first parameter based on the minimum SCS index and calculate the preparation time based on the first parameter. In some examples, the first parameter may specify a quantity of symbols.

At block 1206, the BS may transmit a grant for the at least one uplink transmission to a user equipment based on the preparation time, the grant indicating resources for the at least one uplink transmission on the first RF carrier or on each of the first RF carrier and the second RF carrier. For example, the scheduling circuitry 1043 in cooperation with the communication and processing circuitry 1041 and the transceiver 1010, shown and described above in connection with FIG. 10, may provide a means to transmit a grant for the at least one uplink transmission to a user equipment based on the preparation time. In some examples, the resources for the at least one uplink transmission may commence at a first time. In this case, to transmit the grant for the at least one uplink transmission to the UE based on the preparation time, the BS may transmit the grant to the UE at a second time that precedes the first time by at least the preparation time.

In some examples, the resources for the at least one uplink transmission may commence at a first time. In some examples, to transmit the grant for the at least one uplink transmission to the user equipment based on the preparation time, the BS may transmit the grant to the user equipment at a second time that precedes the first time by at least the preparation time.

In some examples, the grant may be configured to trigger a switch by the user equipment between operating in a first uplink transmission mode and operating in a second uplink transmission mode. In some examples, for operation by the UE in the first uplink transmission mode, the grant may indicate at least one first resource for the at least one uplink transmission on the first RF carrier and not on the second RF carrier. In some examples, for operation by the UE in the second uplink transmission mode, the grant may indicate at least one second resource for the at least one uplink transmission on each of the first RF carrier and the second RF carrier.

In some examples, the switch by the UE between operating in the first uplink transmission mode and operating in the second uplink transmission mode is a switch from operating in the first uplink transmission mode to operating in the second uplink transmission mode. In some examples, the switch by the UE between operating in the first uplink transmission mode and operating in the second uplink transmission mode is a switch from operating in the second uplink transmission mode to operating in the first uplink transmission mode.

In some examples, the user equipment includes a plurality of RF chains. In some examples, for operation by the user equipment in the first uplink transmission mode, the grant is configured to trigger the user equipment to use at least two of the plurality of RF chains for the at least one uplink transmission on the first RF carrier. In some examples, for operation by the user equipment in the second uplink transmission mode, the grant is configured to trigger the user equipment to use, for the at least one uplink transmission on each of the first RF carrier and the second RF carrier, at least a first RF chain of the plurality of RF chains to transmit on the first RF carrier and at least a second RF chain of the plurality of RF chains to transmit on the second RF carrier.

Figure 13:
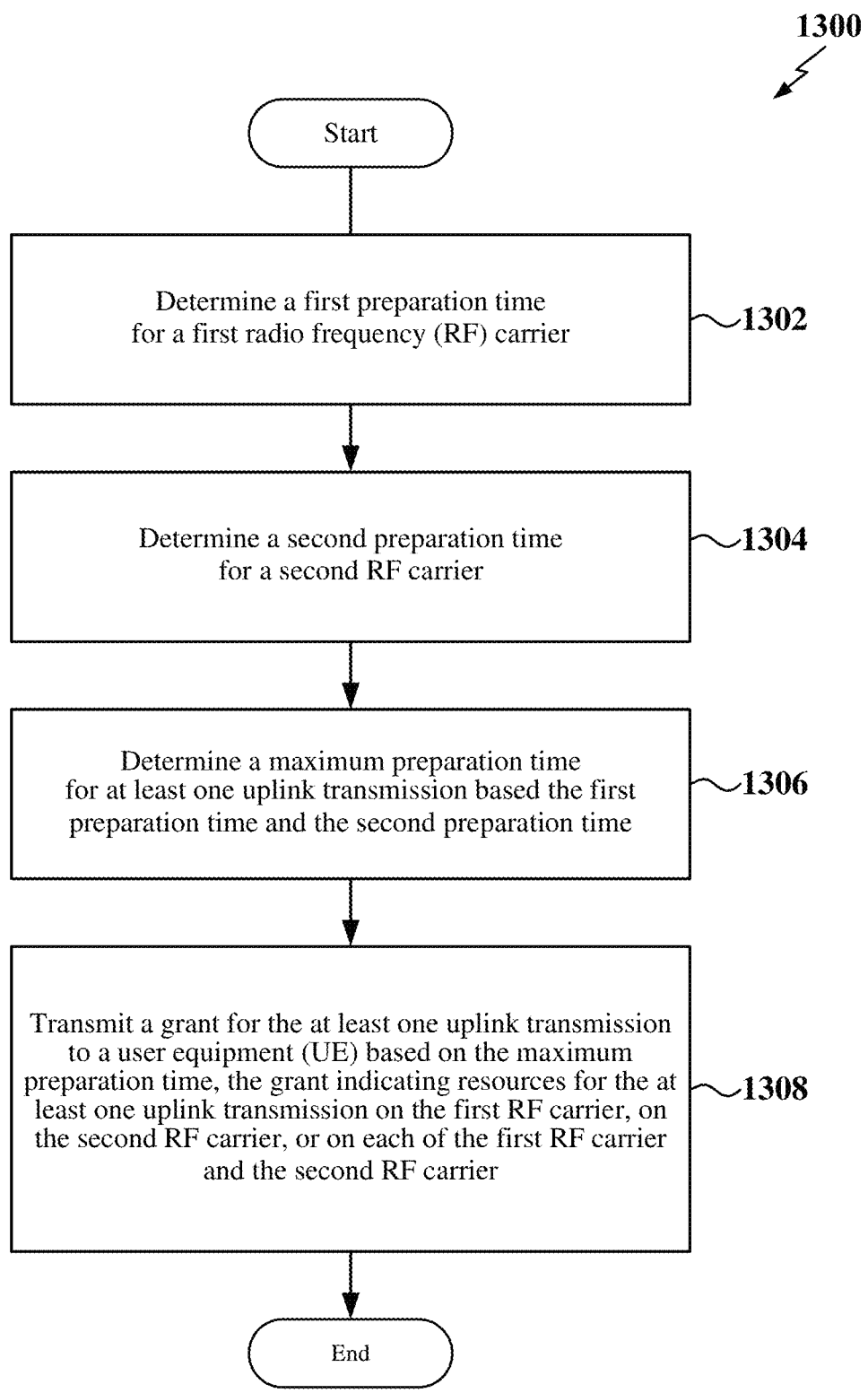
FIG. 13 is a flow chart illustrating an example wireless communication method for scheduling a UE based on a selection of a maximum preparation time according to some aspects.

FIG. 13 is a flow chart illustrating an example wireless communication method 1300 for scheduling a UE based on a selection of a maximum preparation time according to some aspects. As described herein, some or all illustrated features may be omitted in a particular implementation within the scope of the present disclosure, and some illustrated features may not be required for implementation of all examples. In some examples, the method 1300 may be carried out by the BS 1000 (e.g., by the processing system 1014) illustrated in FIG. 10. In some examples, the method 1300 may be carried out by any suitable apparatus or means for carrying out the functions or algorithm described below.

At block 1302, a BS may determine a first preparation time for a first radio frequency (RF) carrier. For example, the preparation time determination circuitry 1042, shown and described above in connection with FIG. 10, may provide a means to determine a first preparation time for a first RF carrier. In some examples, the BS may determine the first preparation time by estimating any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time. In some examples, the BS may determine the first preparation time by determining a subcarrier spacing (SCS) index for the first RF carrier. In some examples, the BS may determine the SCS index for the first RF carrier by determining a lowest SCS of all bandwidth parts (BWPs) of the first RF carrier.

At block 1304, the BS may determine a second preparation time for a second RF carrier. For example, the preparation time determination circuitry 1042, shown and described above in connection with FIG. 10, may provide a means to determine a second preparation time for a second RF carrier. In some examples, the BS may determine the second preparation time by estimating any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time. In some examples, the BS may determine the second preparation time by determining a subcarrier spacing (SCS) index for the second RF carrier. In this case, determining the SCS index for the second RF carrier may include determining a lowest SCS of all bandwidth parts (BWPs) of the second RF carrier.

The RF carriers may be configured in different ways in different implementations. The first RF carrier may be configured for time division duplex (TDD) multiplexing and the second RF carrier may be configured for frequency division duplex (FDD) multiplexing. In some examples, the first RF carrier has a configured downlink and the second RF carrier does not have a configured downlink. In some examples, the first RF carrier may be a Third Generation Partnership Project (3GPP) New Radio (NR) carrier and the second RF carrier may be a 3GPP Long Term Evolution (LTE) carrier.

At block 1306, the BS may determine a maximum preparation time for at least one uplink transmission based on the first preparation time and the second preparation time. For example, the preparation time determination circuitry 1042, shown and described above in connection with FIG. 10, may provide a means to determine a maximum preparation time for at least one uplink transmission based on the first preparation time and the second preparation time. In some examples, to determine the maximum preparation time for the at least one uplink transmission based on the first preparation time and the second preparation time, the BS may select the longest of the first preparation time or the second preparation time.

At block 1308, the BS may transmit a grant for the at least one uplink transmission to a user equipment (UE) based on the maximum preparation time, the grant indicating resources for the at least one uplink transmission on the first RF carrier, on the second RF carrier, or on each of the first RF carrier and the second RF carrier. For example, the scheduling circuitry 1043 in cooperation with the communication and processing circuitry 1041 and the transceiver 1010, shown and described above in connection with FIG. 10, may provide a means to transmit a grant for the at least one uplink transmission to a user equipment (UE) based on the maximum preparation time. In some examples, the resources for the at least one uplink transmission may commence at a first time. In this case, to transmit the grant for the at least one uplink transmission to the UE based on the maximum preparation time, the BS may transmit the grant to the UE at a second time that precedes the first time by at least the maximum preparation time.

In some examples, the grant may be configured to trigger a switch by the UE between operating in a first uplink transmission mode and operating in a second uplink transmission mode. In some examples, for operation by the UE in the first uplink transmission mode, the grant may indicate resources for the at least one uplink transmission on the first RF carrier and not on the second RF carrier. For operation by the UE in the second uplink transmission mode, the grant may indicate resources for the at least one uplink transmission on each of the first RF carrier and the second RF carrier. In some examples, for operation by the UE in the first uplink transmission mode, the grant may indicate resources for the at least one uplink transmission on the first RF carrier and not on the second RF carrier and where, for operation by the UE in the second uplink transmission mode, the grant may indicate resources for the at least one uplink transmission on the second RF carrier and not on the first RF carrier. The switch by the UE between operating in the first uplink transmission mode and operating in the second uplink transmission mode may include a switch from operating in the first uplink transmission mode to operating in the second uplink transmission mode. Alternatively, the switch by the UE between operating in the first uplink transmission mode and operating in the second uplink transmission mode may include a switch from operating in the second uplink transmission mode to operating in the first uplink transmission mode.

In some examples, the BS may determine a third preparation time for a physical uplink shared channel (PUSCH), determine that the third preparation time is less than the maximum preparation time and, responsive to determining that the third preparation time is less than the maximum preparation time, generate the grant to not trigger a switch at the UE between a first uplink transmission mode and a second uplink transmission mode. In some examples, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on each of the first RF carrier and the second RF carrier. Alternatively, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on the second RF carrier and not on the first RF carrier.

Figure 14:
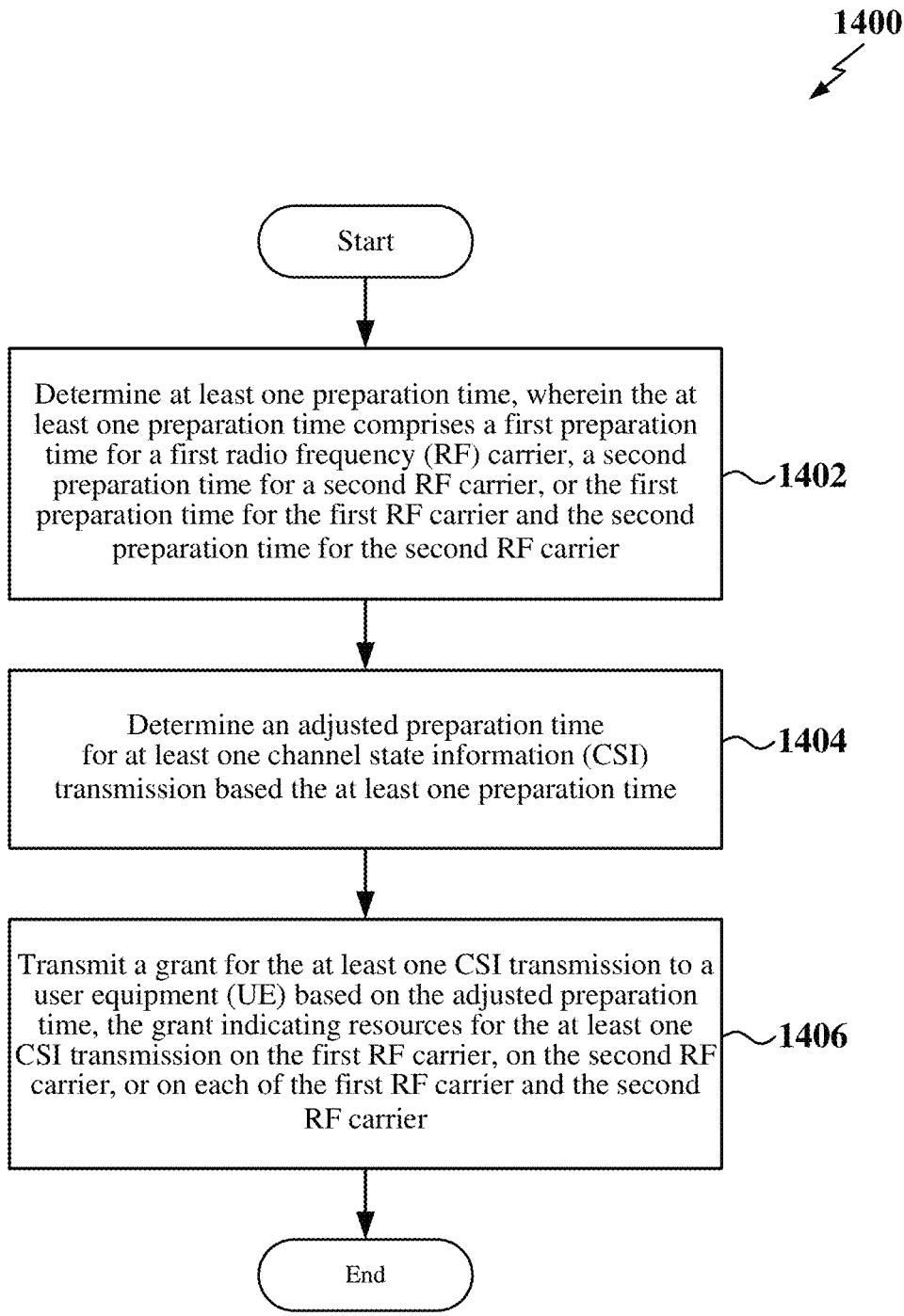
FIG. 14 is a flow chart illustrating an example wireless communication method for scheduling a UE based on an adjusted uplink preparation time according to some aspects.

FIG. 14 is a flow chart illustrating an example wireless communication method 1400 for scheduling a UE based on an adjusted uplink preparation time according to some aspects. As described herein, some or all illustrated features may be omitted in a particular implementation within the scope of the present disclosure, and some illustrated features may not be required for implementation of all examples. In some examples, the method 1400 may be carried out by the BS 1000 (e.g., by the processing system 1014) illustrated in FIG. 10. In some examples, the method 1400 may be carried out by any suitable apparatus or means for carrying out the functions or algorithm described below.

At block 1402, a BS may determine at least one preparation time, wherein the at least one preparation time may include a first preparation time for a first radio frequency (RF) carrier, a second preparation time for a second RF carrier, or the first preparation time for the first RF carrier and the second preparation time for the second RF carrier. For example, the preparation time determination circuitry 1042, shown and described above in connection with FIG. 10, may provide a means to determine at least one preparation time. In some examples, the BS may determine the at least one preparation time by determining at least one preparation time for a single RF carrier (e.g., the first RF carrier or the second RF carrier). In some examples, the BS may determine the at least one preparation time by determining a first preparation time for the first RF carrier and determining a second preparation time for the second RF carrier. In some examples, the BS may determine the at least one preparation time by determining a subcarrier spacing (SCS) index for the first RF carrier and/or determining an SCS index for the second RF carrier.

The RF carriers may be configured in different ways in different implementations. For example, the first RF carrier may be configured for time division duplex (TDD) multiplexing and the second RF carrier may be configured for frequency division duplex (FDD) multiplexing. In another example, the first RF carrier will have a configured downlink and the second RF carrier will not have a configured downlink. In some examples, the first RF carrier may be a Third Generation Partnership Project (3GPP) New Radio (NR) carrier and the second RF carrier may be a 3GPP Long Term Evolution (LTE) carrier.

At block 1404, the BS may determine an adjusted preparation time for at least one channel state information (CSI) transmission based on the at least one preparation time. In some examples, determining the adjusted preparation time may include increasing an uplink preparation time by a defined value. For example, the preparation time determination circuitry 1042, shown and described above in connection with FIG. 10, may provide a means to determine an adjusted preparation time for at least one channel state information (CSI) transmission based on the at least one preparation time. The use of this defined value may result in an increase of the preparation time (e.g., by a factor based on the defined value).

In some examples, the BS may determine the adjusted preparation time by determining a maximum preparation time based on the first preparation time and the second preparation time. In some examples, to determine the maximum preparation time based the first preparation time and the second preparation time, the BS may select the longest of the first preparation time or the second preparation time.

At block 1406, the BS may transmit a grant for the at least one CSI transmission to a user equipment (UE) based on the adjusted preparation time, the grant indicating resources for the at least one CSI transmission on the first RF carrier, on the second RF carrier, or on each of the first RF carrier and the second RF carrier. For example, the scheduling circuitry 1043 in cooperation with the communication and processing circuitry 1041 and the transceiver 1010, shown and described above in connection with FIG. 10, may provide a means to transmit a grant for the at least one CSI transmission to a user equipment (UE) based on the adjusted preparation time. In some examples, the grant may indicate resources for the at least one CSI transmission on a single RF carrier (e.g., the first RF carrier or the second RF carrier). Alternatively, the grant may indicate resources for the at least one CSI transmission on the first RF carrier and on the second RF carrier.

In some examples, the resources for the at least one CSI transmission may commence at a first time. In this case, to transmit the grant for the at least one CSI transmission to the UE based on the adjusted preparation time, the BS may transmit the grant to the UE at a second time that precedes the first time by at least the maximum preparation time.

The grant may be configured to trigger a switch by the UE between operating in a first uplink transmission mode and operating in a second uplink transmission mode. Here, to determine the adjusted preparation time, the BS may increase an uplink preparation time by a defined value, where the defined value is greater than zero if the switch by the UE between operating in the first uplink transmission mode and operating in the second uplink transmission mode takes place at the first time. Alternatively, to determine the adjusted preparation time, the BS may increase an uplink preparation time by a defined value, where the defined value is zero if the switch by the UE between operating in the first uplink transmission mode and operating in the second uplink transmission mode does not take place at the first time.

In some examples, the BS may determine a third preparation time for a physical uplink shared channel (PUSCH), determine that the third preparation time is less than the maximum preparation time and, responsive to determining that the third preparation time is less than the maximum preparation time, generate the grant to not trigger a switch at the UE between a first uplink transmission mode and a second uplink transmission mode. In some examples, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on each of the first RF carrier and the second RF carrier. Alternatively, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on the second RF carrier and not on the first RF carrier.

Figure 15:
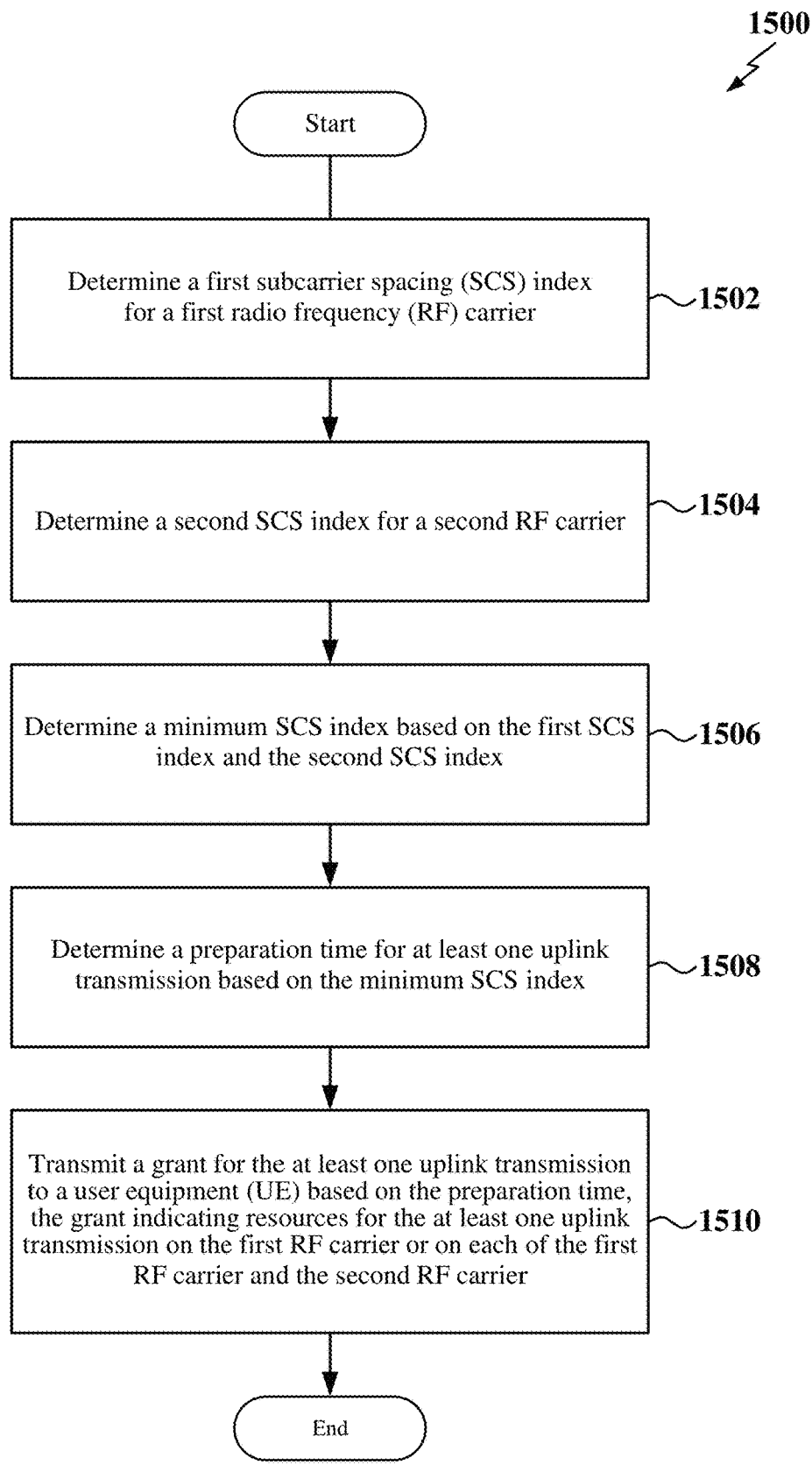
FIG. 15 is a flow chart illustrating an example wireless communication method for scheduling a UE based on a selection of a minimum SCS index according to some aspects.

FIG. 15 is a flow chart illustrating an example wireless communication method 1500 for scheduling a UE based on a selection of a minimum SCS index according to some aspects. As described below, some or all illustrated features may be omitted in a particular implementation within the scope of the present disclosure, and some illustrated features may not be required for implementation of all examples. In some examples, the method 1500 may be carried out by the BS 1000 (e.g., by the processing system 1014) illustrated in FIG. 10. In some examples, the method 1500 may be carried out by any suitable apparatus or means for carrying out the functions or algorithm described below.

At block 1502, a BS may determine a first subcarrier spacing (SCS) index for a first radio frequency (RF) carrier. For example, the preparation time determination circuitry 1042, shown and described above in connection with FIG. 10, may provide a means to determine a first SCS index for a first RF carrier. In some examples, to determine the first SCS index for the first RF carrier, the BS may determine a lowest SCS of all bandwidth parts (BWPs) of the first RF carrier.

At block 1504, the BS may determine a second SCS index for a second RF carrier. For example, the preparation time determination circuitry 1042, shown and described above in connection with FIG. 10, may provide a means to determine a second SCS index for a second RF carrier. In some examples, to determine the second SCS index for the first RF carrier, the BS may determine a lowest SCS of all bandwidth parts (BWPs) of the second RF carrier.

The RF carriers may be configured in different ways in different implementations. For example, the first RF carrier may be configured for time division duplex (TDD) multiplexing and the second RF carrier may be configured for frequency division duplex (FDD) multiplexing. In some examples, the first RF carrier may be a first component carrier of a plurality of component carriers for the UE and the second RF carrier may be a second component carrier of the plurality of component carriers. In some examples, the first RF carrier may be a first millimeter wave (mmW) band carrier or a first sub-6 GHz band carrier and the second RF carrier may be a second millimeter wave (mmW) band carrier or a second sub-6 GHz band carrier. In some examples, the first RF carrier may be a Frequency Range 1 (FR1) carrier and the second RF carrier may be a Frequency Range 2 (FR2) carrier. Alternatively, the first RF carrier may be a Frequency Range 2 (FR2) carrier and the second RF carrier may be a Frequency Range 1 (FR1) carrier.

At block 1506, the BS may determine a minimum SCS index based on the first SCS index and the second SCS index. For example, the preparation time determination circuitry 1042, shown and described above in connection with FIG. 10, may provide a means to determine a minimum SCS index based on the first SCS index and the second SCS index. In some examples, to determine the minimum SCS index based on the first SCS index and the second SCS index, the BS may select the lowest of the first SCS index or the second SCS index.

At block 1508, the BS may determine a preparation time for at least one uplink transmission based on the minimum SCS index. For example, the preparation time determination circuitry 1042, shown and described above in connection with FIG. 10, may provide a means to determine a preparation time for at least one uplink transmission based on the minimum SCS index. In some examples, to determine the preparation time, the BS may estimate any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time.

At block 1510, the BS may transmit a grant for the at least one uplink transmission to a user equipment (UE) based on the preparation time, the grant indicating resources for the at least one uplink transmission on the first RF carrier or on each of the first RF carrier and the second RF carrier. For example, the scheduling circuitry 1043 in cooperation with the communication and processing circuitry 1041 and the transceiver 1010, shown and described above in connection with FIG. 10, may provide a means to transmit a grant for the at least one uplink transmission to a user equipment (UE) based on the preparation time. In some examples, the resources for the at least one uplink transmission may commence at a first time. In this case, to transmit the grant for the at least one uplink transmission to the UE based on the preparation time, the BS may transmit the grant to the UE at a second time that precedes the first time by at least the preparation time.

In some examples, the grant may be configured to trigger a switch by the UE between operating in a first uplink transmission mode and operating in a second uplink transmission mode. For operation by the UE in the first uplink transmission mode, the grant may indicate resources for the at least one uplink transmission on the first RF carrier and not on the second RF carrier. In addition, for operation by the UE in the second uplink transmission mode, the grant may indicate resources for the at least one uplink transmission on each of the first RF carrier and the second RF carrier. In some examples, the switch by the UE between operating in the first uplink transmission mode and operating in the second uplink transmission mode may be a switch from operating in the first uplink transmission mode to operating in the second uplink transmission mode. Alternatively, the switch by the UE between operating in the first uplink transmission mode and operating in the second uplink transmission mode may be a switch from operating in the second uplink transmission mode to operating in the first uplink transmission mode.

In some examples, the UE may include a plurality of RF chains where, for operation by the UE in the first uplink transmission mode, the grant may be configured to trigger the UE to use at least two of the plurality of RF chains for the at least one uplink transmission on the first RF carrier. In some examples, the UE may include a plurality of RF chains, where, for operation by the UE in the second uplink transmission mode, the grant may be configured to trigger the UE to use, for the at least one uplink transmission on each of the first RF carrier and the second RF carrier, at least a first RF chain of the plurality of RF chains to transmit on the first RF carrier and at least a second RF chain of the plurality of RF chains to transmit on the second RF carrier.

Figure 16:
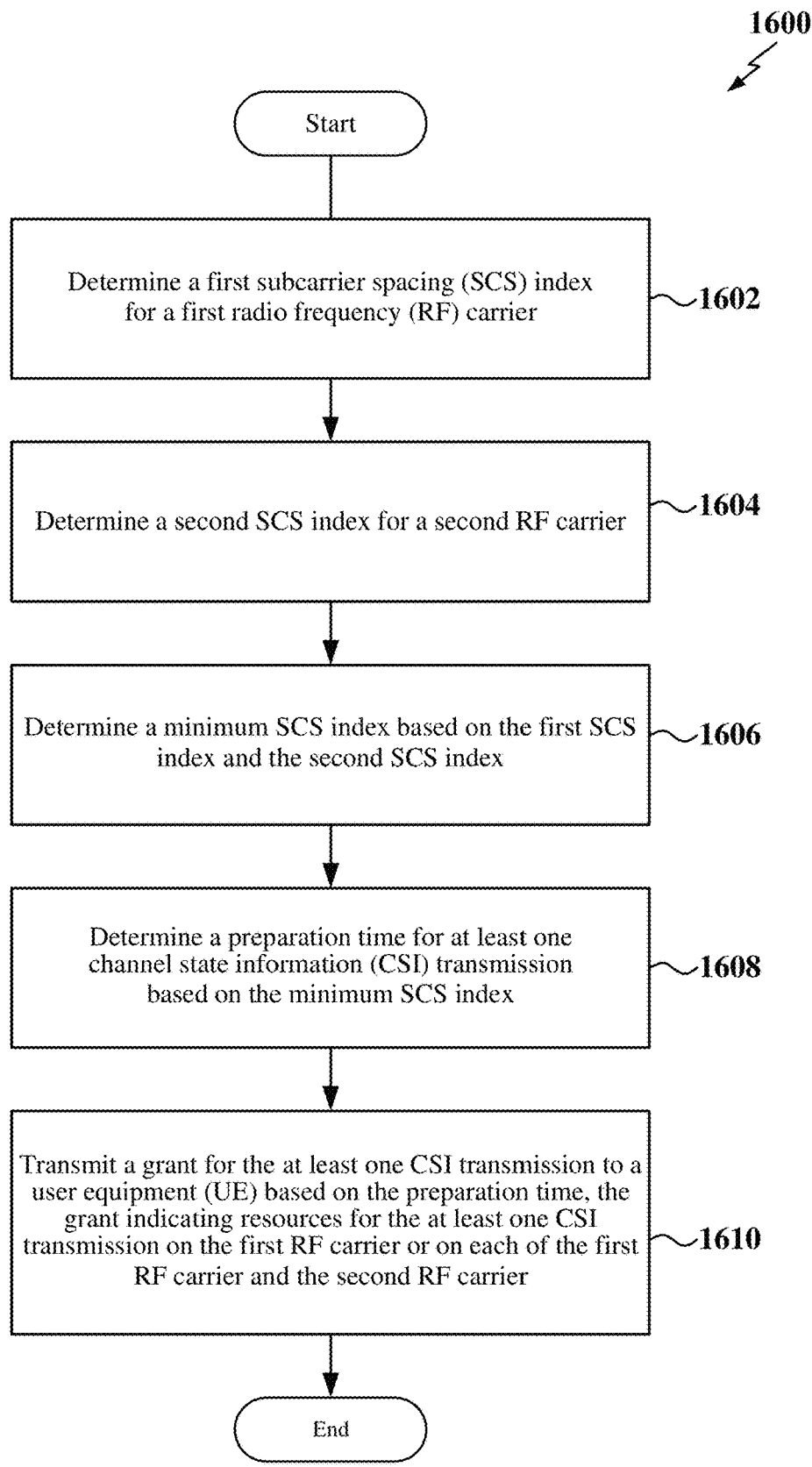
FIG. 16 is a flow chart illustrating another example wireless communication method for scheduling a UE based on a selection of a minimum SCS index according to some aspects.

FIG. 16 is a flow chart illustrating another example wireless communication method 1600 for scheduling a UE based on a selection of a minimum SCS index according to some aspects. As described below, some or all illustrated features may be omitted in a particular implementation within the scope of the present disclosure, and some illustrated features may not be required for implementation of all examples. In some examples, the method 1600 may be carried out by the BS 1000 (e.g., by the processing system 1014) illustrated in FIG. 10. In some examples, the method 1600 may be carried out by any suitable apparatus or means for carrying out the functions or algorithm described below.

At block 1602, a BS may determine a first subcarrier spacing (SCS) index for a first radio frequency (RF) carrier. For example, the preparation time determination circuitry 1042, shown and described above in connection with FIG. 10, may provide a means to determine a first SCS index for a first RF carrier. In some examples, to determine the first SCS index for the first RF carrier, the BS may determine a lowest SCS of all bandwidth parts (BWPs) of the first RF carrier.

At block 1604, the BS may determine a second SCS index for a second RF carrier. For example, the preparation time determination circuitry 1042, shown and described above in connection with FIG. 10, may provide a means to determine a second SCS index for a second RF carrier. In some examples, to determine the second SCS index for the first RF carrier, the BS may determine a lowest SCS of all bandwidth parts (BWPs) of the second RF carrier.

The RF carriers may be configured in different ways in different implementations. For example, the first RF carrier may be configured for time division duplex (TDD) multiplexing and the second RF carrier may be configured for frequency division duplex (FDD) multiplexing. In some examples, the first RF carrier may be a first component carrier of a plurality of component carriers for the UE and the second RF carrier may be a second component carrier of the plurality of component carriers. The first RF carrier may be a first millimeter wave (mmW) band carrier or a first sub-6 GHz band carrier and the second RF carrier may be a second millimeter wave (mmW) band carrier or a second sub-6 GHz band carrier. The first RF carrier may be a Frequency Range 1 (FR1) carrier and the second RF carrier may be a Frequency Range 2 (FR2) carrier. Alternatively, the first RF carrier may be a Frequency Range 2 (FR2) carrier and the second RF carrier may be a Frequency Range 1 (FR1) carrier.

At block 1606, the BS may determine a minimum SCS index based on the first SCS index and the second SCS index. For example, the preparation time determination circuitry 1042, shown and described above in connection with FIG. 10, may provide a means to determine a minimum SCS index based on the first SCS index and the second SCS index. In some examples, to determine the minimum SCS index based on the first SCS index and the second SCS index, the BS may select the lowest of the first SCS index or the second SCS index.

At block 1608, the BS may determine a preparation time for at least one channel state information (CSI) transmission based on the minimum SCS index. For example, the preparation time determination circuitry 1042, shown and described above in connection with FIG. 10, may provide a means to determine a preparation time for at least one channel state information (CSI) transmission based on the minimum SCS index. In some examples, to determine the preparation time, the BS may estimate any one of a first duration of time required by the UE to decode the grant, a second duration of time required by the UE to generate the at least one CSI transmission, a third duration of time associated with switching between a first CSI transmission mode and a second CSI transmission mode, a fourth duration of time required by the UE for waiting for a valid transmission time in an CSI transmission pipeline, or a combination of these durations of time.

At block 1610, the BS may transmit a grant for the at least one CSI transmission to a user equipment (UE) based on the preparation time, the grant indicating resources for the at least one CSI transmission on the first RF carrier or on each of the first RF carrier and the second RF carrier. For example, the scheduling circuitry 1043 in cooperation with the communication and processing circuitry 1041 and the transceiver 1010, shown and described above in connection with FIG. 10, may provide a means to transmit a grant for the at least one CSI transmission to a user equipment (UE) based on the preparation time. In some examples, the BS may transmit the grant on the first RF carrier. The grant may schedule the at least one CSI transmission on the second RF carrier.

In some examples, resources for the at least one CSI transmission may commence at a first time. In this case, to transmit the grant for the at least one CSI transmission to the UE based on the preparation time, the BS may transmit the grant to the UE at a second time that precedes the first time by at least the preparation time.

In some examples, a grant may be configured to trigger a switch by the UE between operating in a first CSI transmission mode and operating in a second CSI transmission mode. For operation by the UE in the first CSI transmission mode, the grant may indicate resources for the at least one CSI transmission on the first RF carrier and not on the second RF carrier. For operation by the UE in the second CSI transmission mode, the grant may indicate resources for the at least one CSI transmission on each of the first RF carrier and the second RF carrier. The switch by the UE between operating in the first CSI transmission mode and operating in the second CSI transmission mode may be a switch from operating in the first CSI transmission mode to operating in the second CSI transmission mode. Alternatively, the switch by the UE between operating in the first CSI transmission mode and operating in the second CSI transmission mode may be a switch from operating in the second CSI transmission mode to operating in the first CSI transmission mode.

In some examples, the UE may include a plurality of RF chains, where, for operation by the UE in the first CSI transmission mode, the grant may be configured to trigger the UE to use at least two of the plurality of RF chains for the at least one CSI transmission on the first RF carrier. In some examples, the UE may include a plurality of RF chains, where, for operation by the UE in the second CSI transmission mode, the grant may be configured to trigger the UE to use, for the at least one CSI transmission on each of the first RF carrier and the second RF carrier, at least a first RF chain of the plurality of RF chains to transmit on the first RF carrier and at least a second RF chain of the plurality of RF chains to transmit on the second RF carrier.

In one configuration, the base station 1000 includes means for calculating a preparation time for at least one uplink transmission based on adjusting an uplink preparation time according to a defined value and means for transmitting a grant for the at least one uplink transmission to a user equipment based on the preparation time, the grant indicating resources for the at least one uplink transmission on a first radio frequency (RF) carrier, on a second RF carrier, or on each of the first RF carrier and the second RF carrier. In one configuration, the base station 1000 includes means for determining a minimum subcarrier spacing (SCS) index based on a first SCS index for a first radio frequency (RF) carrier and a second SCS index for a second RF carrier, means for calculating a preparation time for at least one uplink transmission based on the minimum SCS index, and means for transmitting a grant for the at least one uplink transmission to a user equipment based on the preparation time, the grant indicating resources for the at least one uplink transmission on the first RF carrier or on each of the first RF carrier and the second RF carrier. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one or more of FIGS. 1, 2, 4, 5, and 10, and utilizing, for example, the processes and/or algorithms described herein in relation to FIGS. 11-16.

Figure 17:
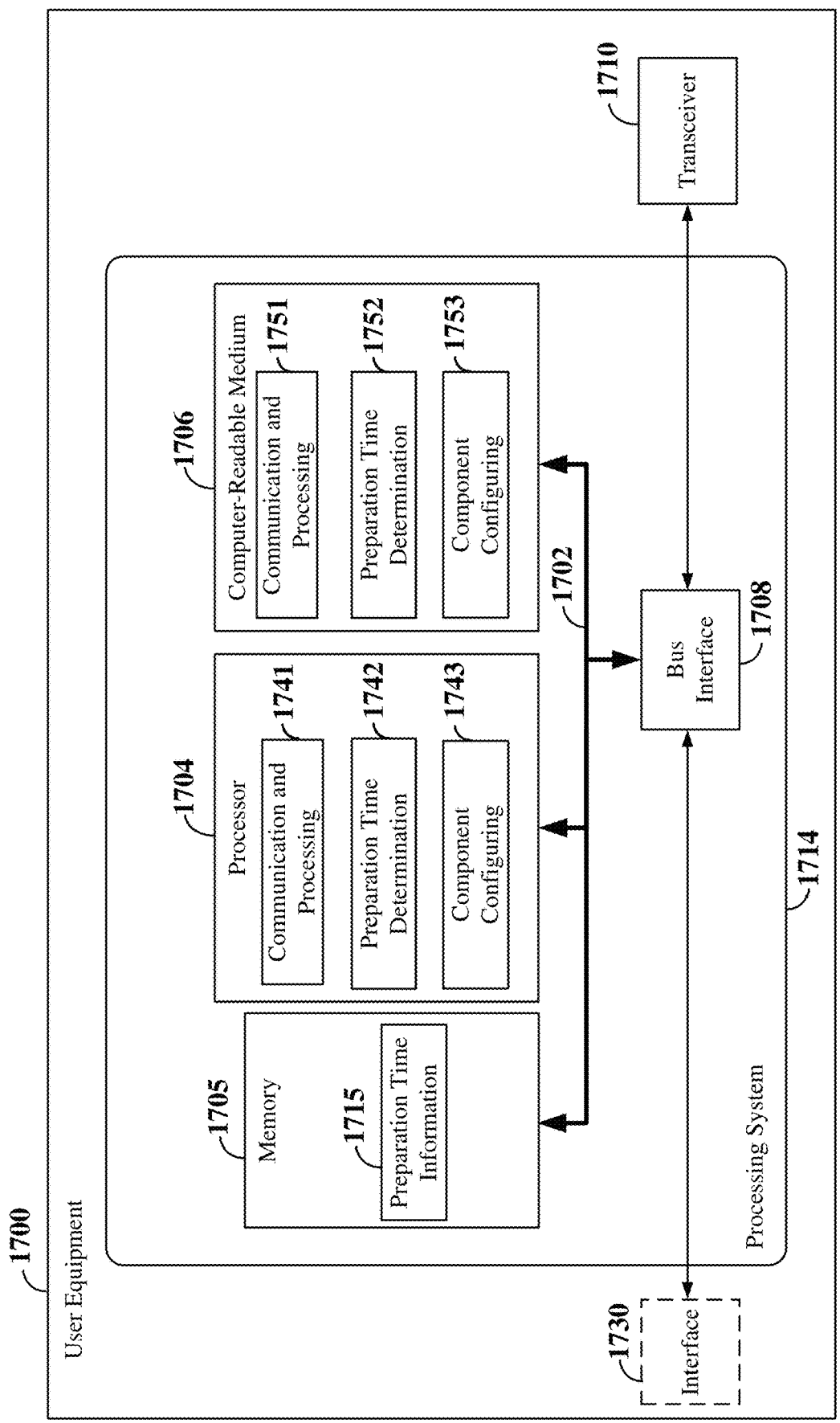
FIG. 17 is a block diagram conceptually illustrating an example of a hardware implementation for a UE employing a processing system according to some aspects.

FIG. 17 is a block diagram conceptually illustrating an example of a hardware implementation for a UE 1700 employing a processing system 1714 according to some aspects. The UE 1700 may be configured to wirelessly communicate with a base station, as discussed in any one or more of FIGS. 1-9. In some implementations, the UE 1700 may correspond to any of the UEs or scheduled entities shown in any of FIGS. 1, 2, 4, and 5.

In accordance with various aspects of the disclosure, an element, or any portion of an element, or any combination of elements may be implemented with the processing system 1714. The processing system 1714 may be substantially the same as the processing system 1014 illustrated in FIG. 10, including a bus interface 1708, a bus 1702, memory 1705, a processor 1704, and a computer-readable medium 1706. The memory 1705 may store preparation time information 1715 (e.g., a calculated preparation time and/or information used to calculate a preparation time) that may be used by the processor 1704 for uplink operations. Furthermore, the UE 1700 may include an interface 1730. The interface 1730 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1730 may include a user interface (e.g., keypad, display, speaker, microphone, joystick). Such a user interface is optional, and may be omitted in some examples, such as an IoT device.

The processor 1704 may in some instances be implemented via a baseband or modem chip and in other implementations, the processor 1704 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

The UE 1700 may be configured to perform any one or more of the operations described herein (e.g., as described above in conjunction with FIGS. 1-9 and as described below in conjunction with FIG. 18). In some examples, the processor 1704, as utilized in the UE 1700, may include circuitry configured for various functions.

In some examples, the processor 1704 may include communication and processing circuitry 1741. The communication and processing circuitry 1741 may be configured to communicate with a base station, such as a gNB. The communication and processing circuitry 1741 may include one or more hardware components that provide the physical structure that performs various processes related to communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. The communication and processing circuitry 1741 may further be configured to execute communication and processing software 1751 included on the computer-readable medium 1706 to implement one or more functions described herein.

In some implementations where the communication involves receiving information, the communication and processing circuitry 1741 may obtain information from a component of the UE 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations where the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

The processor 1704 may include preparation time determination circuitry 1742 configured to perform preparation time determination-related operations as discussed herein. The preparation time determination circuitry 1742 may be configured to execute preparation time determination software 1752 included on the computer-readable medium 1706 to implement one or more functions described herein.

The preparation time determination circuitry 1742 may include functionality for a means for determining a preparation time. For example, the preparation time determination circuitry 1742, shown and described above in connection with FIG. 17, may determine a $T_{proc,2}$ parameter or a $T_{proc,CSI}$ parameter for a first component carrier, or for a second component carrier, or for each of a first component carrier and a second component carrier.

The processor 1704 may include component configuring circuitry 1743 configured to perform component configuring-related operations as discussed herein. In some examples, the preparation time determination circuitry 1742, shown and described above in connection with FIG. 17, may provide a means to determine a $T_{proc,2}$ parameter or a $T_{proc,CSI}$ parameter for a first component carrier, for a second component carrier, or for each of a first component carrier and a second component carrier. The component configuring circuitry 1743 may be further configured to execute component configuring software 1753 included on the computer-readable medium 1706 to implement one or more functions described herein.

The component configuring circuitry 1743 may include functionality for a means for configuring a component of a UE. For example, the component configuring circuitry 1743, shown and described above in connection with FIG. 17, may configure a clock circuit (e.g., by increasing or decreasing a clock rate) and/or a memory circuit (e.g., by increasing or decreasing an access time).

Figure 18:
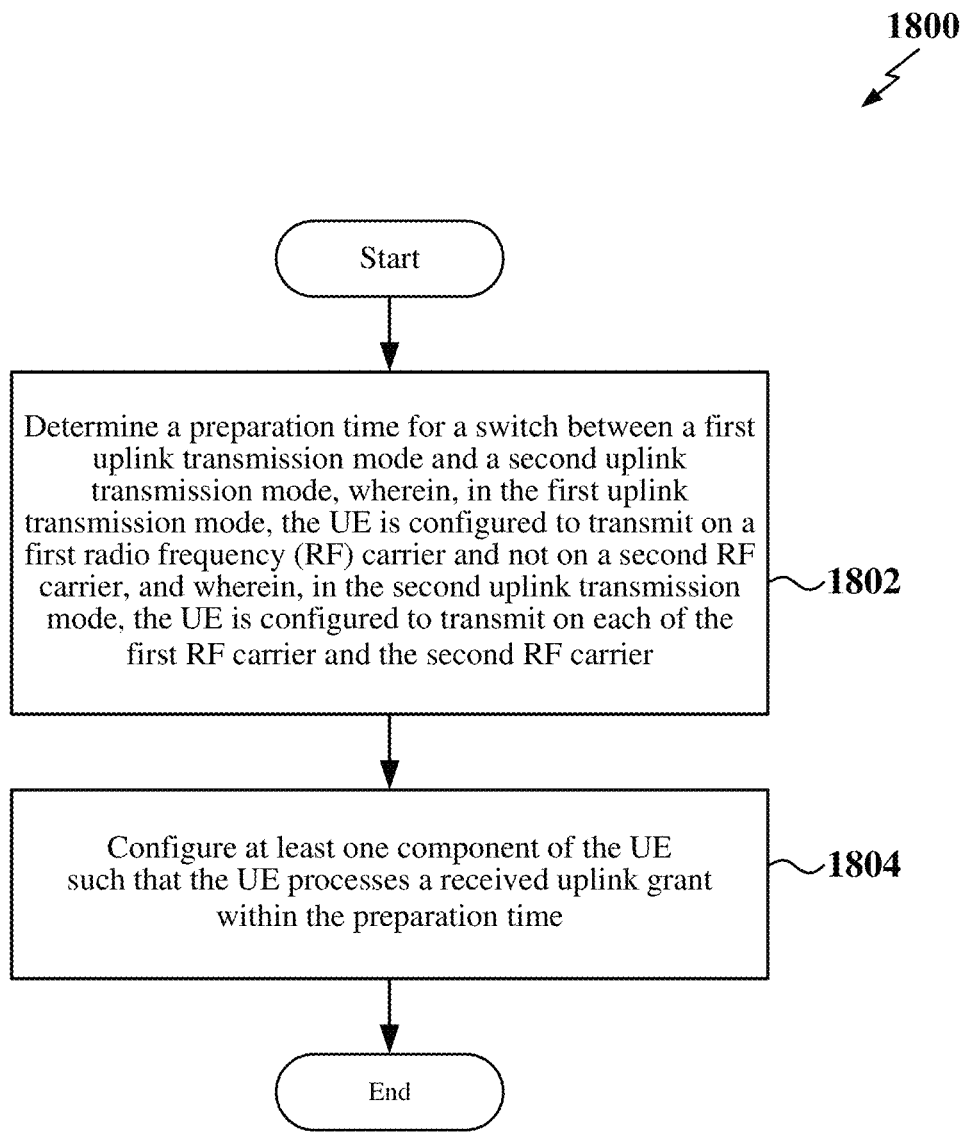
FIG. 18 is a flow chart illustrating an example wireless communication method for configuring a UE according to some aspects.

FIG. 18 is a flow chart illustrating an example wireless communication method 1800 for configuring a UE according to some aspects. As described herein, some or all illustrated features may be omitted in a particular implementation within the scope of the present disclosure, and some illustrated features may not be required for implementation of all examples. In some examples, the method 1800 may be carried out by the UE 1700 illustrated in FIG. 17. In some examples, the method 1800 may be carried out by any suitable apparatus or means for carrying out the functions or algorithm described below.

At block 1802, a UE may determine a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. For example, the preparation time determination circuitry 1742, shown and described above in connection with FIG. 17, may provide a means to determine a preparation time for a switch between a first uplink transmission mode and a second uplink transmission mode.

In some examples, to determine the preparation time, the UE may determine a first preparation time for the first RF carrier, determine a second preparation time for a second RF carrier, and determine a largest preparation time of the first preparation time and the second preparation time. In some examples, the first preparation time may be a preparation time for a physical uplink shared channel (PUSCH) transmission by the UE or a preparation time for a channel state information (CSI) transmission by the UE. In addition, the second preparation time may be a preparation time for a PUSCH transmission by the UE or a preparation time for a CSI transmission by the UE.

In some examples, the switch between the first uplink transmission mode and the second uplink transmission mode may include a switch from the first uplink transmission mode to the second uplink transmission mode. Alternatively, the switch between the first uplink transmission mode and the second uplink transmission mode may include a switch from the second uplink transmission mode to the first uplink transmission mode.

The RF carriers may be configured in different ways in different implementations. For example, the first RF carrier may be configured for time division duplex (TDD) multiplexing and the second RF carrier may be configured for frequency division duplex (FDD) multiplexing. In some examples, the first RF carrier has a configured downlink, while the second RF carrier does not have a configured downlink. In some examples, the first RF carrier may be a Third Generation Partnership Project (3GPP) New Radio (NR) carrier and the second RF carrier is a 3GPP Long Term Evolution (LTE) carrier.

At block 1804, the UE may configure at least one component of the UE such that the UE processes a received uplink grant within the preparation time. For example, the component configuring circuitry 1743, shown and described above in connection with FIG. 17, may provide a means to configure at least one component of the UE such that the UE processes a received uplink grant within the preparation time. In some examples, to configure the at least one component, the UE may set a processing clock speed. Alternatively, or in addition, to configure the at least one component, the UE may set a memory allocation.

In one configuration, the UE 1700 includes means for determining a preparation time for a switch between a first uplink transmission mode and a second uplink transmission mode and means for configuring at least one component of the UE such that the UE processes a received uplink grant within the preparation time. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1, 2, 4, 5, and 17, and utilizing, for example, the processes and/or algorithms described herein in relation to FIG. 18.

One innovative aspect of the subject matter described in this disclosure can be implemented in a method for wireless communication. The method includes determining a first preparation time for a first radio frequency (RF) carrier and determining a second preparation time for a second RF carrier. In addition, a grant is transmitted for at least one uplink transmission to a user equipment (UE) based on a maximum preparation time, where the maximum preparation time is determined based on the first preparation time and the second preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine a first preparation time for a first radio frequency (RF) carrier and determine a second preparation time for a second RF carrier. The processor and the memory are also configured to transmit a grant for at least one uplink transmission to a user equipment (UE) based on a maximum preparation time, where the maximum preparation time is determined based on the first preparation time and the second preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes means for determining a first preparation time for a first radio frequency (RF) carrier and a second preparation time for a second RF carrier, a means for determining a maximum preparation time, and a means for transmitting a grant. The means for determining a maximum preparation time determines a maximum preparation time based on the first preparation time and the second preparation time. The means for transmitting a grant transmits a grant for at least one uplink transmission to a user equipment (UE) based on the maximum preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in an article of manufacture for use by wireless communication device (e.g., a base station). The article of manufacture includes a non-transitory computer-readable medium having stored therein instructions executable by one or more processors of the wireless communication device to determine a first preparation time for a first radio frequency (RF) carrier and determine a second preparation time for a second RF carrier. The computer-readable medium also has stored therein instructions executable by one or more processors of the wireless communication device to transmit a grant for at least one uplink transmission to a user equipment (UE) based on a maximum preparation time, where the maximum preparation time is determined based on the first preparation time and the second preparation time. The grant indicates resources for the at least one uplink transmission on the first RF carrier, on the second RF carrier, or on each of the first RF carrier and the second RF carrier.

In some implementations of the methods and wireless communication devices, the resources for the at least one uplink transmission commence at a first time and transmitting the grant for the at least one uplink transmission to the UE based on the maximum preparation time includes transmitting the grant to the UE at a second time that precedes the first time by at least the maximum preparation time. In some implementations of the methods and wireless communication devices, determining the maximum preparation time for the at least one uplink transmission based on the first preparation time and the second preparation time includes selecting the longest of the first preparation time or the second preparation time.

In some implementations of the methods and wireless communication devices, the grant is configured to trigger a switch by the UE between operating in a first uplink transmission mode and operating in a second uplink transmission mode. In some implementations, the methods and wireless communication devices may be configured to determine a third preparation time for a physical uplink shared channel (PUSCH), determine that the third preparation time is less than the maximum preparation time and, responsive to determining that the third preparation time is less than the maximum preparation time, generate the grant to not trigger a switch at the UE between a first uplink transmission mode and a second uplink transmission mode.

One innovative aspect of the subject matter described in this disclosure can be implemented in a method for wireless communication. The method includes determining at least one preparation time. The at least one preparation time may be a first preparation time for a first radio frequency (RF) carrier, a second preparation time for a second RF carrier, or the first preparation time for the first RF carrier and the second preparation time for the second RF carrier. In addition, a grant is transmitted for at least one uplink transmission to a user equipment (UE) based on an adjusted preparation time for at least one channel state information (CSI) transmission, where the adjusted preparation time is determined based on the at least one preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine at least one preparation time. The at least one preparation time may be a first preparation time for a first radio frequency (RF) carrier, a second preparation time for a second RF carrier, or the first preparation time for the first RF carrier and the second preparation time for the second RF carrier. The processor and the memory are also configured to transmit a grant for at least one uplink transmission to a user equipment (UE) based on an adjusted preparation time for at least one channel state information (CSI) transmission, where the adjusted preparation time is determined based on the at least one preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes means for determining at least one preparation time, means for determining an adjusted preparation time, and means for transmitting a grant. The means for determining at least one preparation time determines a first preparation time for a first radio frequency (RF) carrier, a second preparation time for a second RF carrier, or the first preparation time for the first RF carrier and the second preparation time for the second RF carrier. The means for determining an adjusted preparation time determines an adjusted preparation time for at least one channel state information (CSI) transmission based on the at least one preparation time. The means for transmitting a grant transmits a grant for at least one uplink transmission to a user equipment (UE) based on the adjusted preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in an article of manufacture for use by wireless communication device (e.g., a base station). The article of manufacture includes a non-transitory computer-readable medium having stored therein instructions executable by one or more processors of the wireless communication device to determine at least one preparation time. The at least one preparation time may be a first preparation time for a first radio frequency (RF) carrier, a second preparation time for a second RF carrier, or the first preparation time for the first RF carrier and the second preparation time for the second RF carrier. The computer-readable medium also has stored therein instructions executable by one or more processors of the wireless communication device to transmit a grant for at least one uplink transmission to a user equipment (UE) based on an adjusted preparation time for at least one channel state information (CSI) transmission, where the adjusted preparation time is determined based on the at least one preparation time. The grant indicates resources for the at least one uplink transmission on the first RF carrier, on the second RF carrier, or on each of the first RF carrier and the second RF carrier.

In some implementations of the methods and wireless communication devices, determining the adjusted preparation time includes increasing an uplink preparation time by a defined value. In some implementations of the methods and wireless communication devices, determining the adjusted preparation time includes determining a maximum preparation time based on the first preparation time and the second preparation time. In some implementations of the methods and wireless communication devices, determining the maximum preparation time based on the first preparation time and the second preparation time may include selecting the longest of the first preparation time or the second preparation time. In some implementations of the methods and wireless communication devices, determining the maximum preparation time for the at least one uplink transmission based on the first preparation time and the second preparation time includes selecting the longest of the first preparation time or the second preparation time.

In some implementations of the methods and wireless communication devices, the resources for the at least one uplink transmission commence at a first time and transmitting the grant for the at least one uplink transmission to the UE based on the maximum preparation time includes transmitting the grant to the UE at a second time that precedes the first time by at least the maximum preparation time. In some implementations of the methods and wireless communication devices, the grant is configured to trigger a switch by the UE between operating in a first uplink transmission mode and operating in a second uplink transmission mode.

One innovative aspect of the subject matter described in this disclosure can be implemented in a method for wireless communication. The method includes determining a first subcarrier spacing (SCS) index for a first radio frequency (RF) carrier, a second SCS index for a second RF carrier, and a minimum SCS index based on the first SCS index and the second SCS index. In addition, a grant is transmitted for at least one uplink transmission to a user equipment (UE) based on a preparation time for at least one uplink transmission based on the minimum SCS index, where the preparation time is determined based on the minimum SCS index. The grant indicates resources for the at least one uplink transmission on the first RF carrier or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine a first subcarrier spacing (SCS) index for a first radio frequency (RF) carrier, a second SCS index for a second RF carrier, and a minimum SCS index based on the first SCS index and the second SCS index. The processor and the memory are also configured to transmit a grant for at least one uplink transmission to a user equipment (UE) based on a preparation time for at least one uplink transmission based on the minimum SCS index, where the preparation time is determined based on the minimum SCS index. The grant indicates resources for the at least one uplink transmission on the first RF carrier or on each of the first RF carrier and the second RF carrier.

Another innovative aspect of the subject matter described in this disclosure can be implemented in a wireless communication device (e.g., a base station). The wireless communication device includes means for determining a subcarrier spacing (SCS), a means for determining a preparation time, and a means for transmitting a grant. The means for determining a preparation time determines a first subcarrier spacing (SCS) index for a first radio frequency (RF) carrier, a second SCS index for a second RF carrier, and a minimum SCS index based on the first SCS index and the second SCS index. The means for determining a preparation time determines a preparation time for at least one uplink transmission based on the minimum SCS index. The means for transmitting a grant transmits a grant for at least one uplink transmission to a user equipment (UE) based on the preparation time. The grant indicates resources for the at least one uplink transmission on the first RF carrier or on each of the first RF carrier and the second RF carrier.

Another innovative aspect of the subject matter described in this disclosure can be implemented in an article of manufacture for use by wireless communication device (e.g., a base station). The article of manufacture includes a non-transitory computer-readable medium having stored therein instructions executable by one or more processors of the wireless communication device to determine a first subcarrier spacing (SCS) index for a first radio frequency (RF) carrier, a second SCS index for a second RF carrier, and a minimum SCS index based on the first SCS index and the second SCS index. The computer-readable medium also has stored therein instructions executable by one or more processors of the wireless communication device to transmit a grant for at least one uplink transmission to a user equipment (UE) based on a preparation time for at least one uplink transmission based on the minimum SCS index, where the preparation time is determined based on the minimum SCS index. The grant indicates resources for the at least one uplink transmission on the first RF carrier or on each of the first RF carrier and the second RF carrier.

In some implementations of the methods and wireless communication devices, determining the minimum SCS index based on the first SCS index and the second SCS index includes selecting the lowest of the first SCS index or the second SCS index. In some implementations of the methods and wireless communication devices, the resources for the at least one uplink transmission commence at a first time and transmitting the grant for the at least one uplink transmission to the UE based on the maximum preparation time includes transmitting the grant to the UE at a second time that precedes the first time by at least the maximum preparation time. In some implementations of the methods and wireless communication devices, the grant is configured to trigger a switch by the UE between operating in a first uplink transmission mode and operating in a second uplink transmission mode.

One innovative aspect of the subject matter described in this disclosure can be implemented in a method for wireless communication. The method includes determining a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The method also includes configuring at least one component of the UE such that the UE processes a received uplink grant within the preparation time.

Another innovative aspect of the subject matter described in this disclosure can be implemented in a wireless communication device (e.g., a UE). The wireless communication device includes a transceiver, a memory, and a processor communicatively coupled to the transceiver and the memory. The processor and the memory are configured to determine a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The processor and the memory are also configured to configure at least one component of the UE such that the UE processes a received uplink grant within the preparation time.

Another innovative aspect of the subject matter described in this disclosure can be implemented in a wireless communication device (e.g., a UE). The wireless communication device includes means for determining a preparation time and a means for configuring. The means for determining a preparation time determines a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The means for configuring configures at least one component of the UE such that the UE processes a received uplink grant within the preparation time.

Another innovative aspect of the subject matter described in this disclosure can be implemented in an article of manufacture for use by wireless communication device (e.g., a UE). The article of manufacture includes a non-transitory computer-readable medium having stored therein instructions executable by one or more processors of the wireless communication device to determine a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The computer-readable medium also has stored therein instructions executable by one or more processors of the wireless communication device to configure at least one component of the UE such that the UE processes a received uplink grant within the preparation time.

In some implementations, the methods and wireless communication devices may be configured to switch from the first uplink transmission mode to the second uplink transmission mode. In some implementations, the methods and wireless communication devices may be configured to switch from the second uplink transmission mode to the first uplink transmission mode. In some implementation, the first preparation time is a preparation time for a physical uplink shared channel (PUSCH) transmission by the UE or a preparation time for a channel state information (CSI)

transmission by the UE and the second preparation time is a preparation time for a PUSCH transmission by the UE or a preparation time for a CSI transmission by the UE.

In some implementations of the methods and wireless communication devices, configuring the at least one component includes setting a processing clock speed. In some implementations of the methods and wireless communication devices, configuring the at least one component includes setting a memory allocation. In some implementations of the methods and wireless communication devices, determining the preparation time includes determining a first preparation time for the first RF carrier, determining a second preparation time for the second RF carrier, and determining a largest preparation time of the first preparation time and the second preparation time.

One innovative aspect of the subject matter described in this disclosure can be implemented in a method for wireless communication. The method includes determining a first subcarrier spacing (SCS) index for a first radio frequency (RF) carrier, a second SCS index for a second RF carrier, and a minimum SCS index based on the first SCS index and the second SCS index. In addition, a grant is transmitted for at least one channel state information (CSI) transmission to a user equipment (UE) based on a preparation time for at least one CSI transmission based on the minimum SCS index, where the preparation time is determined based on the minimum SCS index. The grant indicates resources for the at least one CSI transmission on the first RF carrier or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine a first subcarrier spacing (SCS) index for a first radio frequency (RF) carrier, a second SCS index for a second RF carrier, and a minimum SCS index based on the first SCS index and the second SCS index. The processor and the memory are also configured to transmit a grant for at least one channel state information (CSI) transmission to a user equipment (UE) based on a preparation time for at least one CSI transmission based on the minimum SCS index, where the preparation time is determined based on the minimum SCS index. The grant indicates resources for the at least one CSI transmission on the first RF carrier or on each of the first RF carrier and the second RF carrier.

Another innovative aspect of the subject matter described in this disclosure can be implemented in a wireless communication device (e.g., a base station). The wireless communication device includes means for determining a subcarrier spacing (SCS), a means for determining a preparation time, and a means for transmitting a grant. The means for determining a preparation time determines a first subcarrier spacing (SCS) index for a first radio frequency (RF) carrier, a second SCS index for a second RF carrier, and a minimum SCS index based on the first SCS index and the second SCS index. The means for determining a preparation time determines a preparation time for at least one channel state information (CSI) transmission based on the minimum SCS index. The means for transmitting a grant transmits a grant for at least one CSI transmission to a user equipment (UE) based on the preparation time. The grant indicates resources for the at least one CSI transmission on the first RF carrier or on each of the first RF carrier and the second RF carrier.

Another innovative aspect of the subject matter described in this disclosure can be implemented in an article of manufacture for use by wireless communication device (e.g., a base station). The article of manufacture includes a non-transitory computer-readable medium having stored therein instructions executable by one or more processors of the wireless communication device to determine a first subcarrier spacing (SCS) index for a first radio frequency (RF) carrier, a second SCS index for a second RF carrier, and a minimum SCS index based on the first SCS index and the second SCS index. The computer-readable medium also has stored therein instructions executable by one or more processors of the wireless communication device to transmit a grant for at least one channel state information (CSI) transmission to a user equipment (UE) based on a preparation time for at least one CSI transmission based on the minimum SCS index, where the preparation time is determined based on the minimum SCS index. The grant indicates resources for the at least one CSI transmission on the first RF carrier or on each of the first RF carrier and the second RF carrier.

In some implementations of the methods and wireless communication devices, transmitting the grant includes transmitting the grant on the first RF carrier. In some implementations of the methods and wireless communication devices, the grant schedules the at least one CSI transmission on the second RF carrier.

In some implementations of the methods and wireless communication devices, determining the minimum SCS index based on the first SCS index and the second SCS index includes selecting the lowest of the first SCS index or the second SCS index. In some implementations of the methods and wireless communication devices, the resources for the at least one CSI transmission commence at a first time and transmitting the grant for the at least one CSI transmission to the UE based on the maximum preparation time includes transmitting the grant to the UE at a second time that precedes the first time by at least the maximum preparation time. In some implementations of the methods and wireless communication devices, the grant is configured to trigger a switch by the UE between operating in a first CSI transmission mode and operating in a second CSI transmission mode.

The methods shown in FIGS. 11-16 and 18 may include additional aspects, such as any single aspect or any combination of aspects described below and/or in connection with one or more other processes described elsewhere herein. The following provides an overview of several aspects of the present disclosure.

Aspect 1: A method for wireless communication at a base station, the method comprising: calculating a preparation time for at least one uplink transmission based on adjusting an uplink preparation time according to a defined value; and transmitting a grant for the at least one uplink transmission to a user equipment based on the preparation time, the grant indicating resources for the at least one uplink transmission on a first radio frequency (RF) carrier, on a second RF carrier, or on each of the first RF carrier and the second RF carrier.

Aspect 2: The method of aspect 1, wherein the adjusting the uplink preparation time according to the defined value comprises: increasing the uplink preparation time by a constant value.

Aspect 3: The method of aspect 1 or 2, wherein the adjusting the uplink preparation time according to the defined value comprises: increasing the uplink preparation time by a constant value for uplink carrier aggregation of the first RF carrier and the second RF carrier.

Aspect 4: The method of any of aspects 1 through 3, wherein the at least one uplink transmission comprises at least one channel state information (CSI) transmission.

Aspect 5: The method of any of aspects 1 through 4, wherein the at least one uplink transmission comprises at least one physical uplink shared channel (PUSCH) transmission.

Aspect 6: The method of any of aspects 1 through 5, wherein the uplink preparation time is based on: a first parameter; and a constant value.

Aspect 7: The method of aspect 6, wherein the calculating the preparation time comprises: adding the defined value to the uplink preparation time.

Aspect 8: The method of any of aspects 6 through 7, wherein the first parameter specifies a quantity of symbols.

Aspect 9: The method of any of aspects 1 through 8, wherein the calculating the preparation time comprises: determining a minimum SCS index based on a first subcarrier spacing (SCS) index for the first RF carrier and a second SCS index for the second RF carrier; and calculating the preparation time based on the minimum SCS index.

Aspect 10: The method of aspect 9, wherein the determining the minimum SCS index based on the first SCS index for the first RF carrier and the second SCS index for the second RF carrier comprises: selecting a lowest SCS index from the first SCS index and the second SCS index.

Aspect 11: The method of any of aspects 9 through 10, wherein the calculating the preparation time based on the minimum SCS index comprises: selecting a first parameter based on the minimum SCS index; and calculating the preparation time based on the first parameter.

Aspect 12: The method of aspect 11, wherein the first parameter specifies a quantity of symbols.

Aspect 13: The method of any of aspects 1 through 12, wherein: the resources for the at least one uplink transmission are scheduled to commence at a first time; and the transmitting the grant comprises transmitting the grant to the user equipment at a second time that precedes the first time by at least the preparation time.

Aspect 14: The method of aspect 13, wherein the grant is configured to trigger a switch by the user equipment between operating in a first uplink transmission mode and operating in a second uplink transmission mode.

Aspect 15: The method of aspect 14, wherein the defined value is greater than zero if the switch by the user equipment between operating in the first uplink transmission mode and operating in the second uplink transmission mode takes place at the first time.

Aspect 16: The method of any of aspects 14 through 15, wherein the defined value is zero if the switch by the user equipment between operating in the first uplink transmission mode and operating in the second uplink transmission mode does not take place at the first time.

Aspect 17: A method for wireless communication at a base station, the method comprising: determining a minimum subcarrier spacing (SCS) index based on a first SCS index for a first radio frequency (RF) carrier and a second SCS index for a second RF carrier; calculating a preparation time for at least one uplink transmission based on the minimum SCS index; and transmitting a grant for the at least one uplink transmission to a user equipment based on the preparation time, the grant indicating resources for the at least one uplink transmission on the first RF carrier or on each of the first RF carrier and the second RF carrier.

Aspect 18: The method of aspect 17, wherein the determining the minimum SCS index based on the first SCS index for the first RF carrier and the second SCS index for the second RF carrier comprises: selecting a lowest SCS index from the first SCS index and the second SCS index.

Aspect 19: The method of any of aspects 17 through 18, wherein the calculating the preparation time for at least one uplink transmission based on the minimum SCS index comprises: selecting a first parameter based on the minimum SCS index; and calculating the preparation time based on the first parameter.

Aspect 20: The method of aspect 19, wherein the first parameter specifies a quantity of symbols.

Aspect 21: The method of any of aspects 17 through 20, wherein: the resources for the at least one uplink transmission commence at a first time; and the transmitting the grant for the at least one uplink transmission to the user equipment based on the preparation time comprises transmitting the grant to the user equipment at a second time that precedes the first time by at least the preparation time.

Aspect 22: The method of any of aspects 17 through 21, wherein: the grant is configured to trigger a switch by the user equipment between operating in a first uplink transmission mode and operating in a second uplink transmission mode; for operation by the UE in the first uplink transmission mode, the grant indicates at least one first resource for the at least one uplink transmission on the first RF carrier and not on the second RF carrier; and for operation by the UE in the second uplink transmission mode, the grant indicates at least one second resource for the at least one uplink transmission on each of the first RF carrier and the second RF carrier.

Aspect 23: The method of aspect 22, wherein the switch by the UE between operating in the first uplink transmission mode and operating in the second uplink transmission mode is a switch from operating in the first uplink transmission mode to operating in the second uplink transmission mode.

Aspect 24: The method of aspect 22, wherein the switch by the UE between operating in the first uplink transmission mode and operating in the second uplink transmission mode is a switch from operating in the second uplink transmission mode to operating in the first uplink transmission mode.

Aspect 25: The method of any of aspects 22 through 24, wherein: the user equipment comprises a plurality of RF chains; for operation by the user equipment in the first uplink transmission mode, the grant is configured to trigger the user equipment to use at least two of the plurality of RF chains for the at least one uplink transmission on the first RF carrier; and for operation by the user equipment in the second uplink transmission mode, the grant is configured to trigger the user equipment to use, for the at least one uplink transmission on each of the first RF carrier and the second RF carrier, at least a first RF chain of the plurality of RF chains to transmit on the first RF carrier and at least a second RF chain of the plurality of RF chains to transmit on the second RF carrier.

Aspect 26: The method of any of aspects 17 through 25, wherein the determining the minimum SCS index comprises: selecting a lowest SCS index from the first SCS index and the second SCS index.

Aspect 27: The method of any of aspects 17 through 26, wherein the calculating the preparation time comprises: selecting a first parameter based on the minimum SCS index; and calculating the preparation time based on the first parameter.

Aspect 28: The method of aspect 27, wherein the first parameter specifies a quantity of symbols.

Aspect 29: A base station comprising: a transceiver configured to communicate with a radio access network, a memory, and a processor communicatively coupled to the transceiver and the memory, wherein the processor and the memory are configured to perform any one of aspects 1 through 16.

Aspect 30: An apparatus configured for wireless communication comprising at least one means for performing any one of aspects 1 through 16.

Aspect 31: A non-transitory computer-readable medium storing computer-executable code, comprising code for causing an apparatus to perform any one of aspects 1 through 16.

Aspect 32: A base station comprising: a transceiver, a memory, and a processor communicatively coupled to the transceiver and the memory, wherein the processor and the memory are configured to perform any one of aspects 17 through 28.

Aspect 33: An apparatus configured for wireless communication comprising at least one means for performing any one of aspects 17 through 28.

Aspect 34: A non-transitory computer-readable medium storing computer-executable code, comprising code for causing an apparatus to perform any one of aspects 17 through 28.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 10, and 17 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a network entity, the method comprising:
    receiving a first uplink transmission on a first radio frequency (RF) carrier;
    calculating an uplink preparation time for at least one second uplink transmission on a second RF carrier in accordance with an uplink RF carrier switch from the first RF carrier to the second RF carrier, the calculating the uplink preparation time including:
        calculating a preparation time parameter, the calculating the preparation time parameter comprising calculating a power-of-two parameter from a minimum subcarrier spacing (SCS) index value, of a set of uplink SCS index values that consists of a first uplink SCS index value for the first RF carrier for the uplink RF carrier switch and a second uplink SCS index value for the second RF carrier for the uplink RF carrier switch, and adding a switching time parameter associated with the uplink RF carrier switch to the preparation time parameter; and transmitting a grant for the at least one second uplink transmission to a user equipment in accordance with the uplink preparation time, the grant indicating resources to carry the at least one second uplink transmission on the second RF carrier, or on each of the first RF carrier and the second RF carrier.

2. The method of claim 1, wherein the switching time parameter comprises a constant value.

3. The method of claim 1, wherein the switching time parameter comprises a constant value for uplink carrier aggregation of the first RF carrier and the second RF carrier.

4. The method of claim 1, wherein the at least one second uplink transmission comprises at least one channel state information (CSI) transmission.

5. The method of claim 1, wherein the at least one second uplink transmission comprises at least one physical uplink shared channel (PUSCH) transmission.

6. The method of claim 1, wherein the uplink preparation time is based on:
a first parameter; and
a constant value.

7. The method of claim 6, wherein the first parameter specifies a quantity of symbols.

8. The method of claim 1, further comprising determining the minimum SCS index value, the determining the minimum SCS index value including:
selecting a lowest SCS index value from the first uplink SCS index value for the first RF carrier for the uplink RF carrier switch and the second uplink SCS index value for the second RF carrier for the uplink RF carrier switch.

9. The method of claim 1, wherein the calculating the uplink preparation time comprises:
selecting a first parameter based on the minimum SCS index value; and
calculating the uplink preparation time based on the first parameter.

10. The method of claim 9, wherein the first parameter specifies a quantity of symbols.

11. The method of claim 1, wherein the calculating the uplink preparation time for the at least one second uplink transmission comprises:
multiplying a first parameter specifying a quantity of symbols by the power-of-two parameter; and
adding the switching time parameter to the first parameter multiplied by the power-of-two parameter.

12. A network entity, comprising:
a transceiver;
one or more memories storing processor-executable code; and
one or more processors configured to execute the processor-executable code to cause the network entity to:
receive, via the transceiver, a first uplink transmission on a first radio frequency (RF) carrier;
calculate an uplink preparation time for at least one second uplink transmission on a second RF carrier in accordance with an uplink RF carrier switch from the first RF carrier to the second RF carrier, the calculation of the uplink preparation time including:
calculate a preparation time parameter, the calculation of the preparation time parameter comprising calculation of a power-of-two parameter from a minimum subcarrier spacing (SCS) index value, of a set of uplink SCS index values that consists of a first uplink SCS index value for the first RF carrier for the uplink RF carrier switch and a second uplink SCS index value for the second RF carrier for the uplink RF carrier switch, and
addition of a switching time parameter associated with the uplink RF carrier switch to the preparation time parameter; and
transmit, via the transceiver, a grant for the at least one second uplink transmission to a user equipment in accordance with the uplink preparation time, the grant indicating resources to carry the at least one second uplink transmission on the second RF carrier, or on each of the first RF carrier and the second RF carrier.

13. The network entity of claim 12, wherein:
the resources for the at least one second uplink transmission are scheduled to commence at a first time; and
the one or more processors are further configured to execute the processor-executable code to cause the network entity to transmit the grant to the user equipment at a second time that precedes the first time by at least the uplink preparation time.

14. The network entity of claim 13, wherein the grant is configured to trigger a first switch by the user equipment between operating in a first uplink transmission mode and operating in a second uplink transmission mode, the first switch by the user equipment between operating in the first uplink transmission mode and operating in the second uplink transmission mode being associated with the RF carrier switch.

15. The network entity of claim 14, wherein the uplink preparation time is greater than zero when the first switch by the user equipment between operating in the first uplink transmission mode and operating in the second uplink transmission mode takes place at the first time.

16. A method for wireless communication at a network entity, the method comprising:
receiving a first uplink transmission on a first radio frequency (RF) carrier;
calculating an uplink preparation time for at least one second uplink transmission on a second RF carrier in accordance with an uplink RF carrier switch from the first RF carrier to the second RF carrier, the calculating the uplink preparation time including:
selecting a quantity of symbols,
deriving a preparation time parameter from the quantity of symbols,
calculating a power-of-two parameter from a minimum subcarrier spacing (SCS) index value, of a set of uplink SCS index values that consists of a first uplink SCS index value for the first RF carrier for the uplink RF carrier switch and a second uplink SCS index value for the second RF carrier for the uplink RF carrier switch, and
multiplying the preparation time parameter by the power-of-two parameter; and
transmitting a grant for the at least one second uplink transmission to a user equipment in accordance with the uplink preparation time, the grant indicating resources to carry the at least one second uplink transmission on the first RF carrier or on each of the first RF carrier and the second RF carrier.

17. The method of claim 16, further comprising determining the minimum SCS index value, the determining the minimum SCS index value including:
  selecting a lowest SCS index value from the set of uplink SCS index values that consists of the first uplink SCS index value for the first RF carrier for the uplink RF carrier switch and the second uplink SCS index value for the second RF carrier for the uplink RF carrier switch.

18. The method of claim 16, wherein:
  the resources for the at least one second uplink transmission commence at a first time; and
  the transmitting the grant for the at least one second uplink transmission to the user equipment based on the uplink preparation time comprises transmitting the grant to the user equipment at a second time that precedes the first time by at least the uplink preparation time.

19. The method of claim 16, wherein:
  the grant is configured to trigger a switch by the user equipment between operating in a first uplink transmission mode and operating in a second uplink transmission mode;
  for operation by the user equipment in the first uplink transmission mode, the grant indicates at least one first resource for the at least one second uplink transmission on the first RF carrier and not on the second RF carrier; and
  for operation by the user equipment in the second uplink transmission mode, the grant indicates at least one second resource for the at least one second uplink transmission on each of the first RF carrier and the second RF carrier.

20. The method of claim 19, wherein the switch by the user equipment between operating in the first uplink transmission mode and operating in the second uplink transmission mode is from operating in the first uplink transmission mode to operating in the second uplink transmission mode.

21. The method of claim 19, wherein the switch by the user equipment between operating in the first uplink transmission mode and operating in the second uplink transmission mode is from operating in the second uplink transmission mode to operating in the first uplink transmission mode.

22. The method of claim 19, wherein:
  the user equipment comprises a plurality of RF chains;
  for operation by the user equipment in the first uplink transmission mode, the grant is configured to trigger the user equipment to use at least two of the plurality of RF chains for the at least one second uplink transmission on the first RF carrier; and
  for operation by the user equipment in the second uplink transmission mode, the grant is configured to trigger the user equipment to use, for the at least one second uplink transmission on each of the first RF carrier and the second RF carrier, at least a first RF chain of the plurality of RF chains to transmit on the first RF carrier and at least a second RF chain of the plurality of RF chains to transmit on the second RF carrier.

23. A network entity, comprising:
  a transceiver;
  one or more memories storing processor-executable code; and
  one or more processors configured to execute the processor-executable code to cause the network entity to:
    receive, via the transceiver, a first uplink transmission on a first radio frequency RF) carrier;
    calculate an uplink preparation time for at least one second uplink transmission on a second RF carrier in accordance with an uplink RF carrier switch from the first RF carrier to the second RF carrier, the calculation of the uplink preparation time including:
      selection of a quantity of symbols,
      derivation of a preparation time parameter from the quantity of symbols,
      calculation of a power-of-two parameter from a minimum subcarrier spacing (SCS) index value, of a set of uplink SCS index values that consists of a first uplink SCS index value for the first RF carrier for the uplink RF carrier switch and a second uplink SCS index value for the second RF carrier for the uplink RF carrier switch, and
      multiplication of the preparation time parameter by the power-of-two parameter; and
    transmit, via the transceiver, a grant for the at least one second uplink transmission to a user equipment in accordance with the uplink preparation time, the grant indicating resources to carry the at least one second uplink transmission on the first RF carrier or on each of the first RF carrier and the second RF carrier.

24. The network entity of claim 23, wherein the one or more processors are further configured to execute the processor-executable code to cause the network entity to:
  select a lowest SCS index value from the set of uplink SCS index values that consists of the first uplink SCS index value and the second uplink SCS index value.

* * * * *